(12) United States Patent
Klingenbrunn et al.

(10) Patent No.: US 9,094,943 B2
(45) Date of Patent: Jul. 28, 2015

(54) NETWORK AND MOBILE DEVICE INITIATED QUALITY OF SERVICE

(75) Inventors: Thomas Klingenbrunn, San Diego, CA (US); Srinivasan Balasubramanian, San Diego, CA (US); Shyamal Ramachandran, San Diego, CA (US); Arvind Swaminathan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 12/561,570

(22) Filed: Sep. 17, 2009

(65) Prior Publication Data

US 2010/0074109 A1    Mar. 25, 2010

Related U.S. Application Data

(60) Provisional application No. 61/098,647, filed on Sep. 19, 2008.

(51) Int. Cl.
| | |
|---|---|
| H04W 4/00 | (2009.01) |
| H04W 76/02 | (2009.01) |
| H04W 36/16 | (2009.01) |
| H04W 28/24 | (2009.01) |

(52) U.S. Cl.
CPC .............. *H04W 76/02* (2013.01); *H04W 36/16* (2013.01); *H04W 28/24* (2013.01)

(58) Field of Classification Search
CPC .. H04L 12/26; H04W 28/24; H04W 36/0083; H04W 36/16; H04W 76/02
USPC ............... 370/230, 341, 401, 331; 455/404.1, 455/161.1
See application file for complete search history.

(56) References Cited

U.S. PATENT DOCUMENTS

| | | | |
|---|---|---|---|
| 6,683,853 B1 | 1/2004 | Kannas et al. | |
| 6,876,667 B1 | 4/2005 | Synnestvedt et al. | |

(Continued)

FOREIGN PATENT DOCUMENTS

| | | |
|---|---|---|
| CN | 101212339 A | 7/2008 |
| EP | 1780973 A1 | 5/2007 |

(Continued)

OTHER PUBLICATIONS

Huawei: "Correction to PCRF informs the requested trigger from PCEF in the roaming scenarios where the V-PLMN does not configure PCC," S2-085547, 3GPP TSG-SA2 Meeting #67, Aug. 25-29, 2008.

(Continued)

*Primary Examiner* — Mark Rinehart
*Assistant Examiner* — Gbemileke Onamuti
(74) *Attorney, Agent, or Firm* — François A. Palaez

(57) ABSTRACT

Systems and methodologies are described that facilitate avoidance of duplicative resource allocation and/or erroneous service charges via unambiguously indicating an entity responsible for quality of service (QoS) initiation. In one example, an indication is provided to a mobile device to indicate a preference for network-initiated QoS or a preference for device-initiated QoS. QoS for a data flow can be established in accordance with the indication. For instance, the mobile device initiates QoS when the indication specifies a preference for device-initiated QoS while a network establishes QoS when the indication specifies a preference for network-initiated QoS.

45 Claims, 15 Drawing Sheets

(56) References Cited

U.S. PATENT DOCUMENTS

| | | | |
|---|---|---|---|
| 7,106,718 | B2 | 9/2006 | Oyama et al. |
| 2003/0035401 | A1* | 2/2003 | Shaheen et al. ............... 370/341 |
| 2003/0039259 | A1* | 2/2003 | Madour ........................ 370/401 |
| 2004/0071126 | A1 | 4/2004 | Ramos-Escano et al. |
| 2006/0002345 | A1* | 1/2006 | Lapraye ........................ 370/331 |
| 2006/0121917 | A1 | 6/2006 | Shin |
| 2007/0058545 | A1* | 3/2007 | Nookala et al. ............... 370/230 |
| 2007/0177604 | A1 | 8/2007 | Ozawa et al. |
| 2007/0242738 | A1 | 10/2007 | Park et al. |
| 2008/0069086 | A1 | 3/2008 | Shin et al. |
| 2008/0153454 | A1* | 6/2008 | Haapapuro et al. ......... 455/404.1 |
| 2008/0205413 | A1* | 8/2008 | Purnadi et al. ................ 370/401 |
| 2009/0068969 | A1* | 3/2009 | Lindoff et al. ............. 455/161.1 |

FOREIGN PATENT DOCUMENTS

| | | |
|---|---|---|
| RU | 2003112465 A | 8/2004 |
| WO | 0228122 | 4/2002 |
| WO | WO03034260 A1 | 4/2003 |
| WO | WO2004089211 | 10/2004 |
| WO | WO2007128343 | 11/2007 |
| WO | WO2008055541 A1 | 5/2008 |
| WO | 2008088259 A1 | 7/2008 |
| WO | WO2009050569 A2 | 4/2009 |

OTHER PUBLICATIONS

Taiwan Search Report—TW098131635—TIPO—Feb. 21, 2013.

3GPP, Ericsson: "TD S2-080431, IMS Session Establishment with Network Initiated PDP Context" 3GPP Jan. 18, 2008, pp. 1-2, XP002572121 Retrieved from the Internet: URL : http: //www.3gpp.org/ftp/Specs/html -info/TDocExMtg-S2-62--26584.htm> [retrieved on Mar. 8, 2010].

3GPP, Nokia, Nokia Siemens Networks: "TD S2-080571, IMS session setup and network initiated PDP context" 3GPP Jan. 18, 2008, pp. 1-3, XP002572122 Retrieved from the Internet: URL: http : //www.3gpp. org/ftp/Specs/html -info/TDocExMtg-S2-62-26584. htm> [ retrieved on Mar. 8, 2010].

CT1: "LS on Network Initiated PDP Context" 3GPP Draft; S2-080031__S2-075572__C1-073190-LS-OUT, 3rd Generation Partnership Project (3GPP), Mobile Competence Centre ; 650, Route Des Lucioles ; F-06921 Sophia-Antipolis Cedex ; France, vol. SA WG2, no. Marina del Rey; Dec. 18, 2007, XP050262567 [retrieved on Dec. 18, 2007].

International Search Report and Written Opinion—PCT/US2009/057584—ISA/EPO—Mar. 19, 2010.

* cited by examiner

NETWORK AND MOBILE DEVICE INITIATED QUALITY OF SERVICE

CROSS-REFERENCE TO RELATED APPLICATIONS

This application claims the benefit of U.S. Provisional Patent application Ser. No. 61/098,647 entitled "METHOD AND APPARATUS FOR DETERMINING WHETHER RADIO NETWORK OR MOBILE DEVICE INITIATES QUALITY OF SERVICE (QOS) FOR APPLICATIONS SUPPORTING BOTH OPTIONS" which was filed Sep. 19, 2008. The entirety of the aforementioned application is hereby incorporated by reference.

BACKGROUND

I. Field

The following description relates generally to wireless communications, and more particularly to unambiguously indicating a preference for at least one of network-initiated quality of service (QoS) or device-initiated QoS.

II. Background

Wireless communication systems are widely deployed to provide various types of communication content such as voice and data, Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

As the demand for high-rate and multimedia data services rapidly grows, there has been an effort toward implementation of efficient and robust communication systems with enhanced performance. For example, in recent years, users have started to replace fixed line communications with mobile communications and have increasingly demanded great voice quality, reliable service, and low prices.

To accommodate increasing demand, evolution of core networks of wireless communication systems followed from evolution of radio interfaces. For example, System Architecture Evolution (SAE) lead by 3GPP aims to evolve a Global System for Mobile communications (GSM)/General Packet Radio Service (GPRS) core network. The resultant Evolved Packet Core (EPC) is a multi-access core network based on the Internet Protocol (IP) that enables operators to deploy and utilize one common packet-based core network with a plurality of radio access technologies. The EPC provides optimized mobility for mobile devices and enables efficient handovers between different radio access technologies (e.g., between LTE and High Rate Packet Data (HRPD)). In addition, standardized roaming interfaces enable operators to offer services to subscribers across a variety of access technologies. In addition, the EPC includes an end-to-end quality of service (QoS) concept that enables operators to provide enhanced QoS functions while preserving operator ability to police and charge for such functions.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described relating to indicating a preference for network-initiated QoS or mobile device (e.g., user equipment (UE)) based QoS. For instance, some applications can be QoS unaware so that a core network establishes QoS for communication sessions associated with those applications. Other applications can be QoS aware such that the applications can access and utilize a QoS application program interface (API) of lower protocol layers (e.g., data services layer, etc.) to establish a QoS flow with a core network of a wireless communication system. A particular network may not support device-initiated QoS and/or the particular network can prefer to establish QoS on the network side. In such cases, the core network establishes QoS even for applications which are QoS aware. Accordingly, to avoid duplicative resource allocation and/or erroneous service charges, QoS initiation preference can be unambiguously indicated. In one aspect, an indication is provided to a mobile device to indicate a preference for network-initiated QoS or a preference for device-initiated QoS. In another aspect, the core network can respond to any device-initiated QoS requests with a rejection message when the core network prefers to establish QoS itself. In yet another aspect, mobile devices can compare packet filters associated with network-initiated QoS flows with packet filters associated with device-initiated QoS flows. If filters match, mobile devices can release matched device-initiated QoS flows to free unnecessary resources.

According to an aspect, a method for determining a responsible entity to establish quality of service is provided. The method can comprise receiving an indicator that specifies a preference of a wireless network for at least one of network-initiated quality of service or device-initiated quality of service. The method can also include requesting quality of service for a data flow when the indicator specifies a preference for device-initiated quality of service. In addition, the method can comprise waiting for the wireless network to establish quality of service when the indicator specifies a preference for network-initiated quality of service.

Another aspect relates to an apparatus comprising a memory that retains instructions for: receiving an indicator that specifies a preference of a wireless network for at least one of network-initiated quality of service or device-initiated quality of service, requesting quality of service for a data flow when the indicator specifies a preference for device-initiated quality of service and allowing the wireless network to establish quality of service when the indicator specifies a preference for network-initiated quality of service. The apparatus can further include a processor, coupled to the memory, configured to execute the instructions retained in the memory.

Yet another aspect relates to a wireless communication apparatus. The wireless communication apparatus can include means for receiving an indicator that specifies a preference of a wireless network for at least one of network-initiated quality of service or device-initiated quality of service. The wireless communication apparatus can further comprise means for requesting quality of service for a data flow when the indicator specifies a preference for device-initiated quality of service. In addition, the wireless communication apparatus can comprise means for allowing the wireless network to establish quality of service when the indicator specifies a preference for network-initiated quality of service.

Still another aspect relates to a computer program product, which can comprise a computer-readable medium. The computer-readable medium can include code for causing at least one computer to obtain an indicator from a network, wherein the indicator specifies a preference by the network for at least one of device-initiated quality of service or network-initiated quality of service. In addition, the computer-readable medium can comprise code for causing at least one computer to establish quality of service for a data flow in accordance with the indicator.

Another aspect relates to a wireless communication apparatus comprise a processor configured to obtain an indicator from a network, wherein the indicator specifies a preference by the network for at least one of device-initiated quality of service or network-initiated quality of service. The processor can be further configured to request quality of service for a data flow when the indicator specifies a preference for device-initiated quality of service. In addition, the processor can further be configured to accept a network-initiated quality of service for a data flow when the indicator specifies a preference for network-initiated quality of service.

According to another aspect, a method for utilizing a parameter to specify an entity responsible to establish quality of service is described. The method can include transmitting an indicator to a mobile device, wherein the indicator specifies a preference for at least one of a network-initiated quality of service or device-initiated quality of service. The method can also comprise initiating quality of service for a data flow of an application on the mobile device when the indicator specifies a preference for network-initiated quality of service. In addition, the method can include accepting a request for quality of service for a data flow from the mobile device when the indicator specifies a preference for device-initiated quality of service.

Yet another aspect relates to an apparatus that comprises a memory. The memory can retains instructions for transmitting an indicator to a mobile device, the indicator specifies a preference for at least one of a network-initiated quality of service or device-initiated quality of service, initiating quality of service for a data flows of an application on the mobile device when the indicator specifies a preference for network-initiated quality of service, and accepting a request for quality of service for a data flow from the mobile device when the indicator specifies a preference for device-initiated quality of service. The apparatus can also include a processor coupled to the memory, wherein the processor is configured to execute the instructions in the memory.

Still yet another aspect relates to a wireless communication apparatus. The wireless communication apparatus can include means for transmitting an indicator to a mobile device, wherein the indicator specifies a preference for at least one of a network-initiated quality of service or device-initiated quality of service. The wireless communication apparatus can also comprise means for initiating quality of service for a data flow of an application on the mobile device when the indicator specifies a preference for network-initiated quality of service. In addition, the wireless communication apparatus can include means for accepting a request for quality of service for a data flow from the mobile device when the indicator specifies a preference for device-initiated quality of service.

Another aspect relates to a computer program product that comprises a computer-readable medium. The computer-readable medium can include code for causing at least one computer to transmit an indicator to a mobile device, wherein the indicator specifies a preference by a network for at least one of device-initiated quality of service or network-initiated quality of service. The computer-readable medium can also comprise code for causing at least one computer to establish quality of service for a data flow associated with the mobile device in accordance with the indicator.

In accordance with another aspect, a wireless communication apparatus is provided. The wireless communication apparatus can comprise a processor configured to transmit an indicator to a mobile device, wherein the indicator specifies a preference by a network for at least one of device-initiated quality of service or network-initiated quality of service. The processor can further be configured to accept a request for quality of service for a data flow from the mobile device when the indicator specifies a preference for device-initiated quality of service. In addition, the processor can be configured to establish quality of service for a data flows of an application on the mobile device when the indicator specifies a preference for network-initiated quality of service.

According to another aspect, a method is provided. The method can include receiving a request to initiate quality of service for a data flow from a mobile device, issuing a soft rejection to the mobile device in response to the request and establishing quality of service for the data flow via a network request.

Yet another aspect relates to a method that comprises: waiting for a wireless communication network to establish quality of service for a set of data flows, wherein waiting comprises starting a timer configured to a pre-determined period, identifying data flows from the set of data flows for which quality of service is established, wherein identifying comprises comparing packet filters associated with established quality of service to identify a corresponding data flow, and initiating quality of service for data flows from the set of data flows for which quality of service is not established by the wireless communication network.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
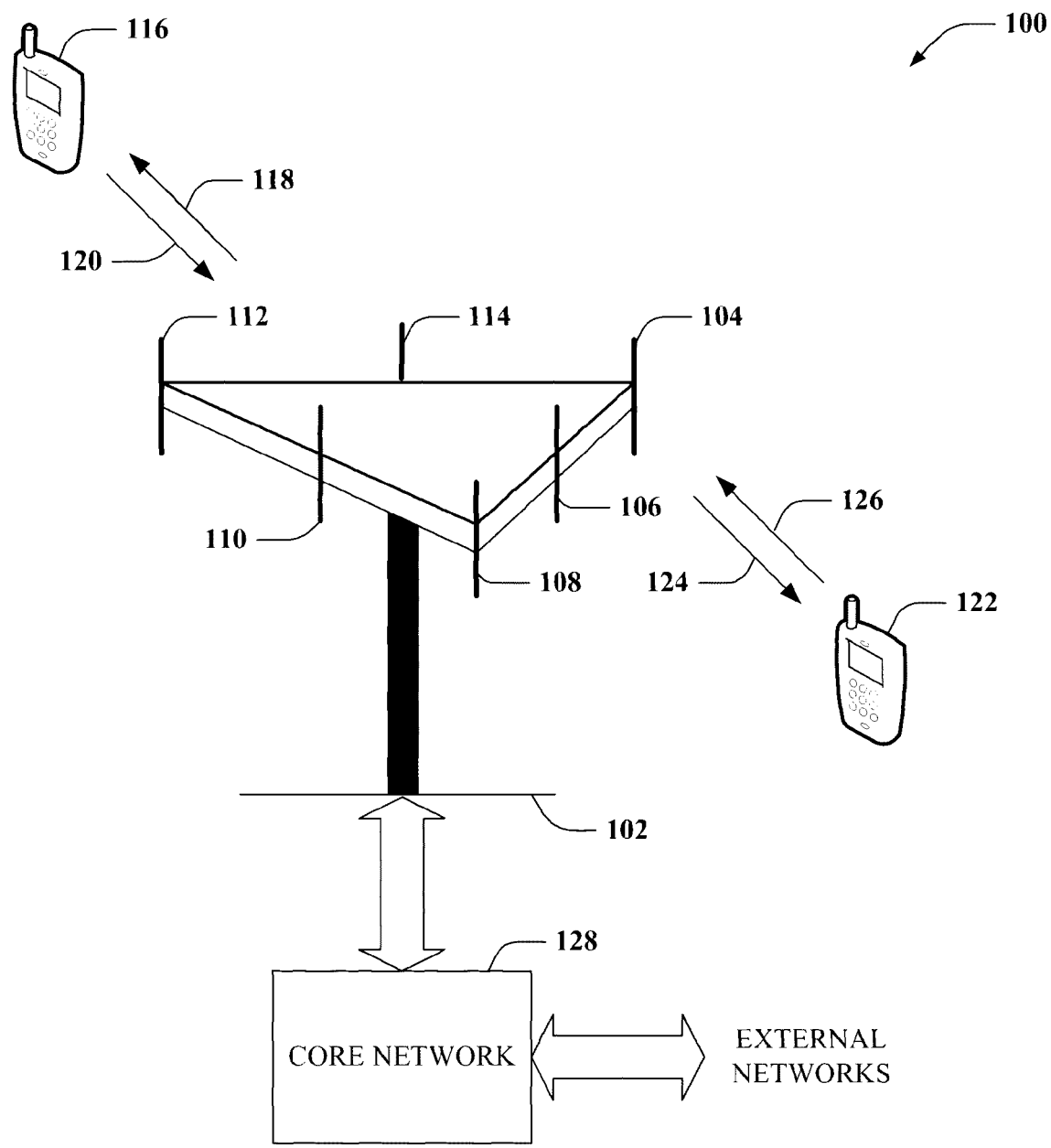
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to computer-related entities such as: hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as, in accordance with a signal, having one or more data packets (e.g., data from one component interacting with another component in a local system, distributed system, and/or across a network such as the Internet with other systems by way of the signal).

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point, Node B, or evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE, LTE-A, SAE, EPC, and GSM are described in documents from an organization named "3rd Generation Partnership Project" (3GPP). Further, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects will be presented in terms of systems that can include a number of devices, components, modules, and the like. It is to be understood and appreciated that the various systems can include additional devices, components, modules, etc. and/or not include all of the devices, components, modules etc. discussed in connection with the figures. A combination of these approaches can also be used.

Referring now to FIG. 1, a wireless communication system 100 is illustrated in accordance with various embodiments presented herein. System 100 comprises a base station (e.g., access point) 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more UEs such as UE 116 and UE 122; however, it is to be appreciated that base station 102 can communicate with substantially any number of UEs similar to UEs 116 and 122. UEs 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, UE 116 is in communication with antennas 112 and 114, where antennas 112 and 114 transmit information to UE 116 over a downlink 118 and receive information from UE 116 over an uplink 120. Moreover, UE 122 is in communication with antennas 104 and 106, where antennas 104 and 106 transmit information to UE 122 over a downlink 124 and receive information from UE 122 over an uplink 126. In a frequency division duplex (FDD) system, downlink 118 can utilize a different frequency band than that used by uplink 120, and downlink 124 can employ a different frequency band than that employed by uplink 126, for example. Further, in a time division duplex (TDD) system, downlink 118 and uplink 120 can utilize a common frequency band and downlink 124 and uplink 126 can utilize a common frequency band.

Each group of antennas and/or the area in which they are designated to communicate can be referred to as a sector of base station 102. For example, antenna groups can be designed to communicate to UEs in a sector of the areas covered by base station 102. In communication over downlinks 118 and 124, the transmitting antennas of base station 102 can utilize beamforming to improve signal-to-noise ratio of downlinks 118 and 124 for UEs 116 and 122. Also, while base station 102 utilizes beamforming to transmit to UEs 116 and 122 scattered randomly through an associated coverage, UEs in neighboring cells can be subject to less interference as compared to a base station transmitting through a single antenna to all its UEs. Moreover, UEs 116 and 122 can communicate directly with one another using a peer-to-peer or ad hoc technology (not shown).

According to an example, system 100 can be a multiple-input multiple-output (MIMO) communication system. Further, system 100 can utilize substantially any type of duplexing technique to divide communication channels (e.g., downlink, uplink, . . . ) such as FDD, FDM, TDD, TDM, CDM, and the like. In addition, communication channels can be orthogonalized to allow simultaneous communication with multiple devices or UEs over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 102 can communicate to the UEs 116 and 122 over the channels, which can be created for various types of data. For example, channels can be created for communicating various types of general communication data, control data (e.g., quality information for other channels, acknowledgement indicators for data received over channels, interference information, reference signals, etc.), and/or the like.

A user can employ an application on UE 116 and/or 122 to communicate with other applications or servers elsewhere in a wireless communication network and/or an external network. Some application can have specific resource requirements (e.g., bandwidth requirements, maximum delay requirements, etc.) that enable an acceptable end-user experience. Resources in a communication system, such as system 100, are limited. Accordingly, it can be necessary to reserve resources for an application prior to initiation of a communication session to enable a minimum quality of service (QoS) to be guaranteed for duration of the session. In one aspect, the QoS can be negotiated between the application (e.g., an application on UE 116 and/or 122) and a core network 128.

In an aspect, the core network 128 can be an evolved packet core (EPC) developed as part of System Architecture Evolution (SAE) by the 3GPP. The core network 128 can be an all Internet Protocol (IP) network that utilizes packet-switched elements for all data and voice communications. The core network 128 can be configured to interface with various external networks such as, but not limited to, a public switched telephone network (PSTN), an IP multimedia subsystem (IMS), an external IP network (e.g., the Internet, a LAN, a WAN, etc.), or the like.

To enable a minimum QoS for an application on UE 116 and/or 122, an end-to-end QoS can be negotiated and established from the mobile device (e.g., UE 116 or 122) to the interface, in the core network 128, with the external networks. In one example, during QoS negotiation, a requester (e.g., an application for device-initiated QoS and/or core network 128 for network-initiated QoS) indicates a packet filter(s) associated with a QoS flow. The packet filter enables a data transmitter (e.g., an application, a server, etc.) to identify IP packets that receive special QoS treatment. The packet filter can, for instance, filter packets on the basis of any suitable field in a TCP or IP header (e.g., IP address, port number, protocol type, etc.).

In an aspect, an application on UE 116 and/or 122 can be classified into one of at least three categories. A first category includes applications which always initiate QoS. A second category includes applications which never initiate QoS. A third category includes applications which are capable of initiating QoS but can forgo initiation in view of a network preference or network capability. For applications in the first two categories, it can be unambiguous as to which entity is responsible for initiating QoS. For applications in the third category, the responsible initiator may not be clear. According to an example, an operator of system 100 can provision applications to UEs 116 and 122 which rely on network-initiated QoS while in the home network (e.g., system 100). However, UE 116 or 122 can roam into a network associated with a different operator (e.g., a non-home network), wherein the non-home network does not support network-initiated QoS. In such cases, applications on UE 116 or 122 should initiate QoS.

To ensure acceptable user experience, applications should ensure communications sessions are supported by QoS. Mixed-mode applications (e.g., application sessions capable of initiating QoS while also allowing network-initiated QoS) can determine whether to initiate QoS or to allow the network to initiate QoS. In one example, the core network 128 can explicitly signal to UEs 116 and 122 an indication that specifies which party (e.g., device or network) is responsible for initiating QoS. In another example, UEs 116 and 122 can attempt to initiate QoS with core network 128. In situations where the core network 128 prefers to initiate QoS, the core network 128 can signal a soft reject to UEs 116 and 122 when a QoS request is received. In yet another example, UEs 116 and 122 can match packet filters of network-initiated QoS flows to packet filters of device-initiated QoS flows. If UEs 116 and 122 identify matching filters, the UEs 116 and 122 can request to release matched device-initiated QoS flows.

Figure 2:
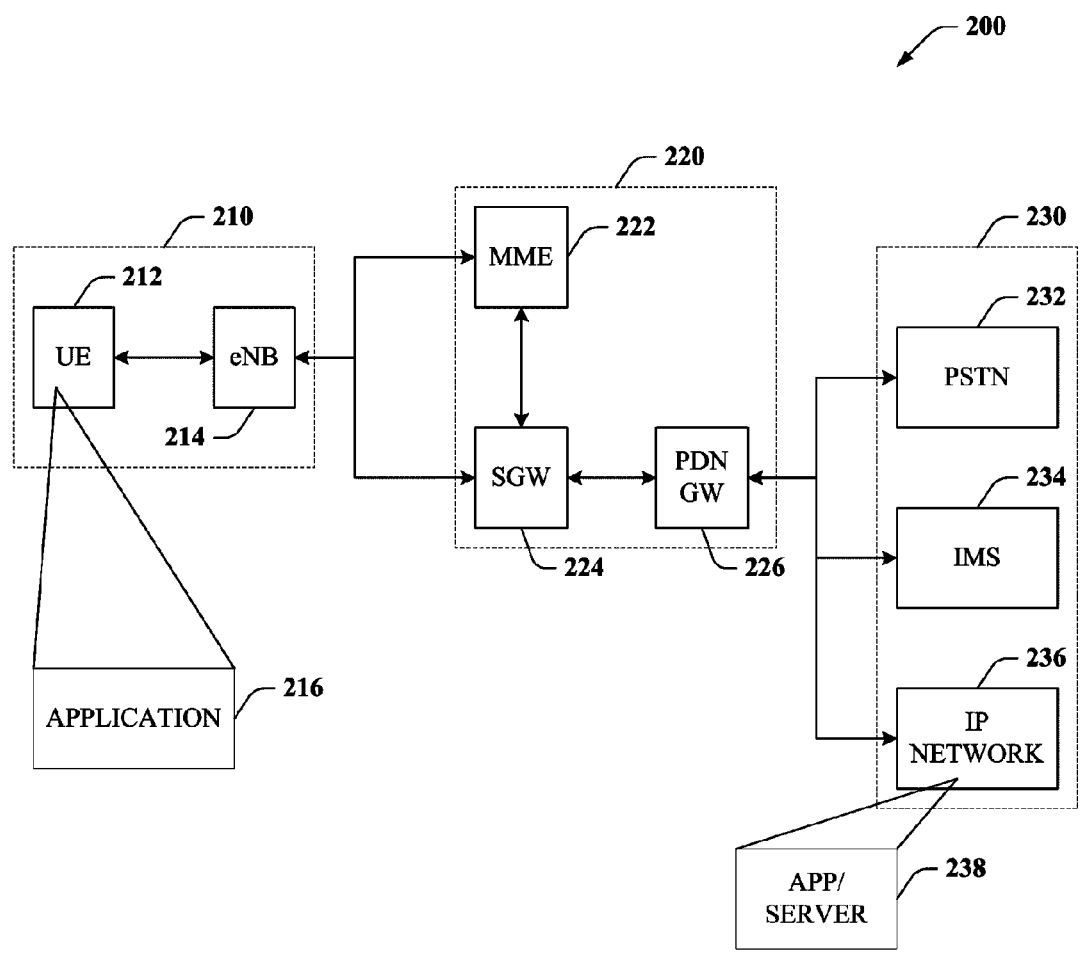
FIG. 2 illustrates an example wireless communication system that facilitates end-to-end QoS that can be device-initiated or network-initiated in accordance with various aspects.

Turning to FIG. 2, illustrated is a wireless communication system 200 that facilitates end-to-end QoS that can be device-initiated or network-initiated in accordance with various aspects. As FIG. 2 illustrates, system 200 can include a radio access network (RAN) 210 that provides wireless radio communications between a UE 212 and an evolved NodeB (eNB) (e.g., a base station, access point, etc.). For simplicity of discussion, FIG. 2 depicts one UE 212 and one eNB 214 in the radio access network 210; however, it is to be appreciated that RAN 210 can include any number of UEs and/or eNBs. In accordance with one aspect, eNB 214 can transmit information to UE 212 over a forward link or downlink channel and UE 212 can transmit information to eNB 214 over a reverse link or uplink channel. The RAN 210 can utilize any suitable type of radio access technology such as, but not limited to, LTE, LTE-A, HSPA, CDMA, high rate packet data (HRPD), evolved HRPD (eHRPD), CDMA2000, GSM, GPRS, enhanced data rate for GSM evolution (EDGE), UMTS, or the like.

The RAN 210, and specifically the eNB 214, can communicate with a core network 220 that enables charging (e.g., usage charges for services, etc.), security (e.g., ciphering and integrity protection), subscriber management, mobility management, bearer management, QoS handling, policy control of data flows, and/or interconnections with external networks 230. The RAN 210 and core network 220 can communicate via an S1 interface, for instance. The core network 220 can include a mobility management entity (MME) 222 that can be an end-point for control signaling from the RAN 210. The MME 222 can provide functions such as mobility management (e.g., tracking), authentication, and security. The MME 222 can communicate with the RAN 210 via the S1 interface. The core network 220 can also include a serving gateway (SGW) 224 which is a user plane node that connects the core network 220 to the RAN 210. In an aspect, the MME 222 can communicate with the SGW 224 via an S11 interface. In another aspect, the MME 222 and SGW 224 can be configured as a single node to provide a single end-point for user and control signaling originating from the RAN 210 and/or terminating at the RAN 210.

The core network 220 can also include a packet data network (PDN) gateway (GW) 226 that facilitates communications between the core network 220 (and RAN 210) and external networks 230. The PDN GW 226 can provide packet filtering, QoS policing, charging, IP address allocation, and routing of traffic to external networks 230. In an example, the SGW 224 and the PDN GW 226 can communicate via an S5 interface. While illustrated as separate nodes in FIG. 2, it is to be appreciated that the SGW 224 and PDN GW 226 can be configured to operate as a single network node in order to reduce user plane nodes in core network 220.

As illustrated in FIG. 2, the core network 220 can communicate with external networks 230 via the PDN GW 226. The external networks 230 can include networks such as, but not limited to, a public switched telephone network (PSTN) 232, an IP multimedia subsystem (IMS) 234, and/or an IP network 236. The IP network 236 can be the Internet, a local area network, a wide area network, an intranet, or the like.

According to an aspect, UE 212 can include an application 216 which can initiate and utilize a communication session to transmit and receive data. In one example, the communication session can be between the application 216 and an application or server 238 associated with IP network 236. Accordingly, data exchanged during the communication sessions routes through the radio access network 210 and the core network 220. The application 216 can specify resource requirements necessary to ensure an acceptable user experience. The resource requirements can be guaranteed via initiating a QoS flow and associating the communication session with the QoS flow. The QoS flow can be an end-to-end QoS through the RAN 210 and the core network 220.

Figure 3:
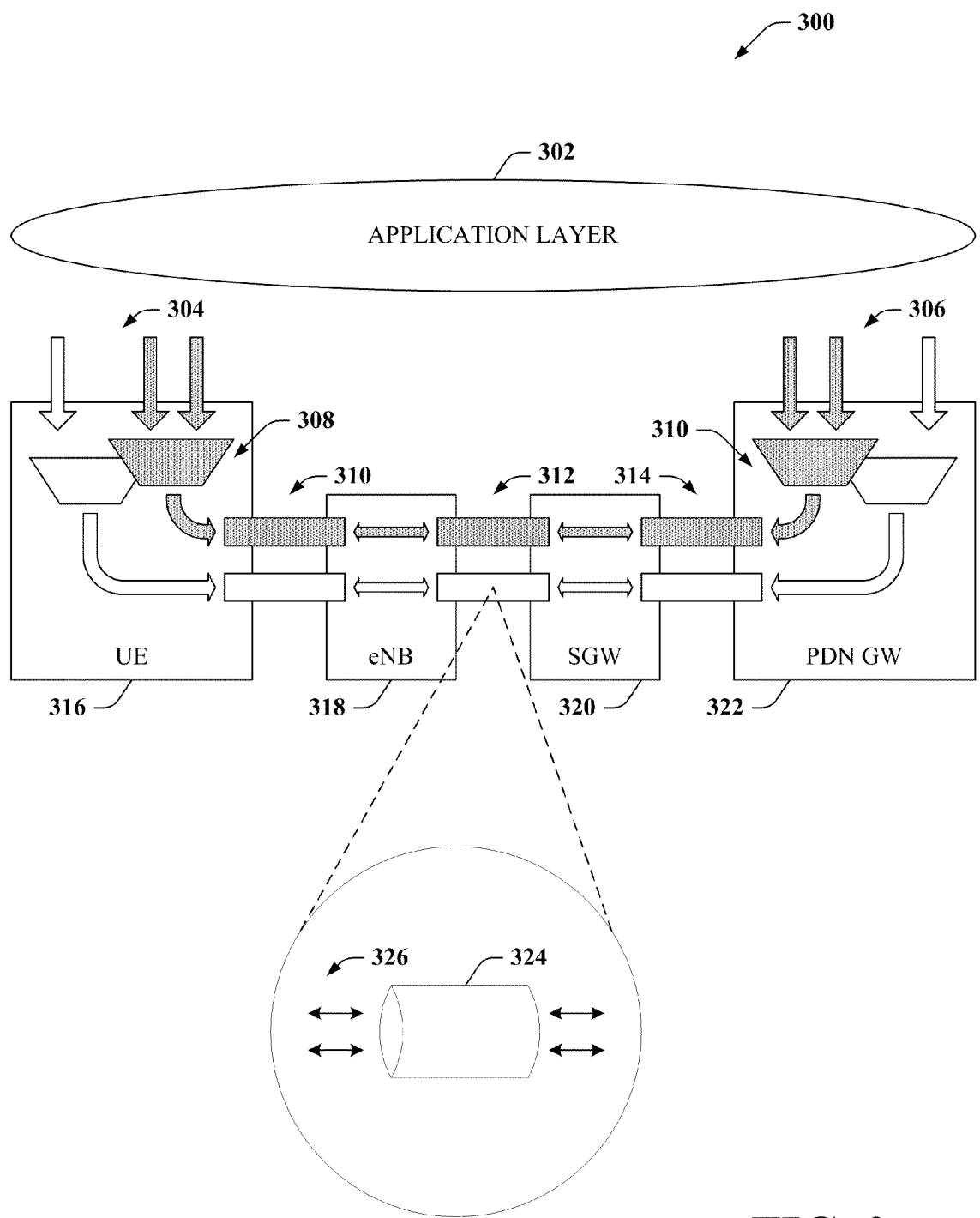
FIG. 3 is an illustration of an example system that facilitates quality of service functions in a wireless communication network in accordance with one or more aspects.

Turning to FIG. 3, illustrated is a system 300 that facilitates quality of service (QoS) functions in a wireless communication network in accordance with one or more aspects. Communications between applications can occur via a protocol at the application layer 302. For instance, a communication session between application 216 and application/server 238 can occur via the application layer 302, for example, by a session initiation protocol (SIP). While interactions can between applications can be conceptualized at a level of the application layer 302, actual data is exchanged via transport layers, data layers, and/or physical layers provided by a radio access network and/or a core network as depicted in FIG. 3.

In an aspect, QoS parameters can be applied to an information flow (e.g., data exchanged between applications during a communication session) to provide acceptable end-user experience through guaranteeing resources that meet requirements. In one example, an EPS bearer can be utilized to apply QoS parameters to the information flow. The EPS bearer is a logical concept that applies between a mobile device (e.g., UE 316) and the PDN GW 322. The EPS bearer can include sub-bearers such as radio bearer 310 between UE 316 and eNB 318. The radio bearer 310 can be a radio link control (RLC) connection between the UE 316 and eNB 318 over the radio interface. In one aspect, one RLC connection can be associated with one radio bearer. Another sub-bearer of the EPS bearer can be an S1 bearer 312 which tunnels packets between the eNB 318 and a SGW 320. In addition, an S5 bearer 314 can tunnel packets between the SGW 320 and the PDN GW 322.

The EPS bearer encapsulates one or more data flows between UE 316 and the PDN GW 322. For instance, service data flows 304 originating from the application layer 302 of UE 316 and/or service data flows 306 associating with the application layer of the PDN GW 322 or an external application can be encapsulated in the EPS bearer. It is to be appreciated that one or more EPS bearers can be established between UE 316 and PDN GW 322. While FIG. 3 depicts two EPS bearers, it is to be appreciated that there can N bearers, where N is an integer greater than or equal to one. As shown in the break-out portion of FIG. 3, a portion 324 of the EPS bearer is shown.

In accordance with an example, each EPS bearer can be associated with a single QoS context. For instance, each EPS bearer can be characterized by a set of parameters that specify QoS. The set of parameters can include an allocation retention pritority (ARP), a guaranteed bit rate (GBR), a maximum bit rate (MBR), and a QoS class identifier (QCI). Data flows that receive similar QoS treatment can be grouped or encapsulated into a same EPS bearer. In an example, the break-out portion of FIG. 3 depicts a portion 324 of an EPS bearer. The EPS bearer 324 is illustrated as encapsulating several data flows 326. As the several data flows 326 are associated jointly with EPS bearer 324, the several data flows 326 receive similar QoS treatment wherein the QoS treatment is defined at least in part on the set of parameters characterizing the EPS bearer 324.

Turning back to FIG. 2, an EPS bearer or QoS can be established to convey a data flow between application 216 of UE 212 and application/server 238 in the IP network. The EPS bearer or QoS context extends from the UE 212 to the PDN GW 226 at which point the PDN GW 226 routes packets from UE 212 to the IP network 236. In addition, the PDN GW 226 obtains packets from the IP network 236 and routes them to the UE 212 in accordance with QoS parameters of the EPS bearer encapsulating the data flow.

In an aspect, the EPS bearer or QoS can be initiated by the application 216 or UE 212. When initiated by the application or UE 212, the QoS can be identified as a device-initiated QoS. In another aspect, the EPS bearer or QoS can be initiated by the network (e.g., by the PDN GW 226, MME 222, and/or the SGW 224). Situations in which QoS is device-initiated and situations in which QoS is network-initiated can be distinguished based at least in part on preference of the application, preference of the network, capability of the application, and/or capability of the network, as discussed infra.

Figure 4:
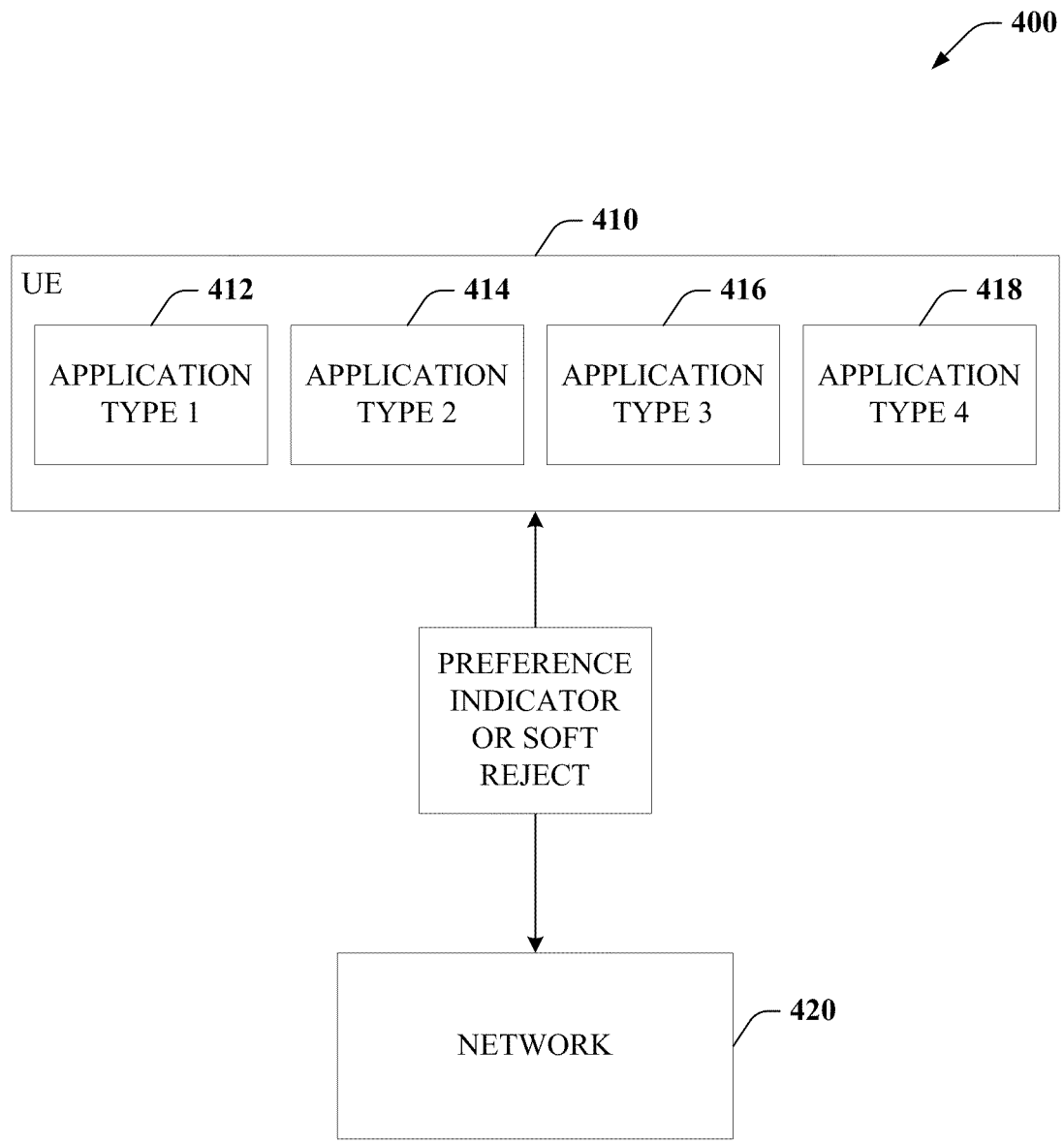
FIG. 4 is an illustration of an example system that facilitates determination of whether to employ device-initiated QoS or network-initiated QoS in accordance with various aspects.

Turning to FIG. 4, illustrated is a system 400 that facilitates determination of whether to employ device-initiated QoS or network-initiated QoS in accordance with various aspects. System 400 includes a UE 410 which connects through wireless communication network 420. The UE 410 can include a variety of applications and/or application types.

According to an example, application 412 can be a third party application (e.g., not provisioned by an operator of network 420) which only supports device-initiated QoS. Application 414 can be an operator provisioned application that supports both device-initiated QoS and network-initiated QoS. However, as an operator provisioned application, application 414 can prefer network-initiated QoS. Application 416 can be a QoS unaware application for which network 420 provides QoS. Application 418 can be a QoS unaware application for which network 420 does not provide QoS. For applications 412, 416, and 418, the entity responsible for QoS initiation can be unambiguous. However, for application 414 which supports both device-initiated and network-initiated QoS, inefficient resource allocation can occur when the entity responsible for QoS is ambiguous.

Figure 5:
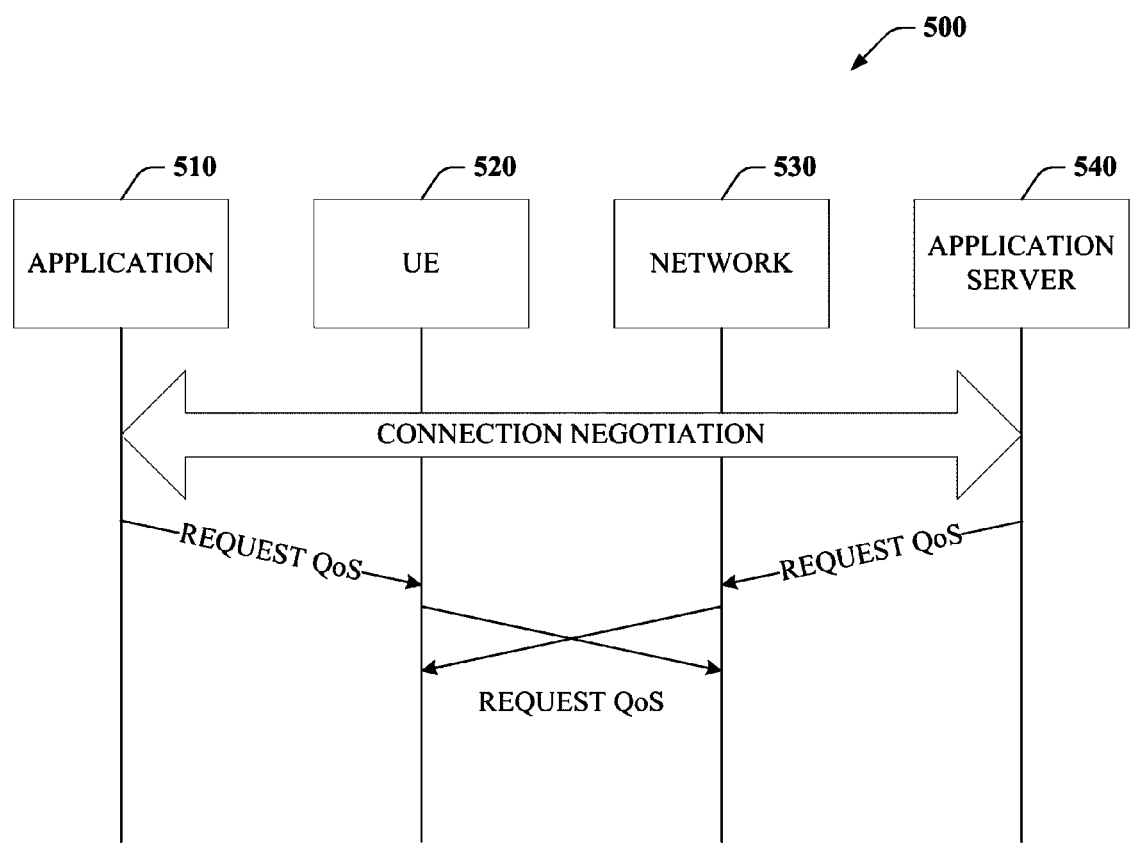
FIG. 5 is an illustration of an example call-flow that depicts a conflict in QoS establishment in accordance with one or more aspects.

For example, FIG. 5 depicts an example call-flow 500 that depicts conflict in QoS establishment in accordance with one or more aspects. The call-flow 500 includes an application 510, UE 520, network 520 and an application server 540. Pursuant to this example, the application 510 can be capable of initiating QoS while also supporting network-initiated QoS. A communication session can commence with a connection negotiation between the application 510 and application server 540. The connection negotiation can be a SIP negotiation; however, it is to be appreciated that any suitable protocol can be employed. After negotiation of the connection, application 510 and application server 540 can both request an establishment of QoS (e.g., application 510 commences a device-initiated QoS while application server 540 requests a network-initiated QoS). After the requests are processed and a bearer setup procedure completes, multiple dedicated bearers (e.g., QoS contexts) can be created for the same communication session or data flow. Thus, resources are doubly allocated to a single data flow leading to wasted resources.

Returning to FIG. 4, mechanisms can be employed by either UE 410 and/or network 420 to unambiguously indicate a responsible party for QoS establishment. According to one aspect, the network 420 can signal a preference indicator to UE 410 when UE 410 attaches and registers with network 420. The preference indicator can specify a preference for network-initiated QoS, a preference for device-initiated QoS, an indication that network-initiated QoS is supported, and/or an indication that network-initiated QoS is not supported. The signal can be conveyed via technology-specific control plane signaling (e.g., Non-Access Stratum (NAS) and/or Radio Resource Control (RRC) signaling). In another example, the preference indicator can be conveyed via technology-independent control plane signaling (e.g., protocol configuration operations transmitted during default bearer setup). In yet other example, the preference indicator can be provided to UE 410 via user plane signaling. For instance, the preference indicator can be included during connection setup (e.g., SIP signaling, etc.). UE 410 can evaluate the preference indicator to determine whether an application capable of device-initiated and network-initiated QoS should request QoS and/or wait for network 420 to establish QoS. For example, the preference indicator can specify that network-initiated QoS is supported and/or preferred. Accordingly, application 414 will not request QoS and defer to the network 420. In another example, the preference indicator can specify that device-initiated QoS is preferred and/or network-initiated QoS is not supported. In such circumstances, the application 414 will initiate QoS.

In accordance with another aspect, network 420 can employ a soft rejection mechanism to reduce duplicated resource assignments. Application 414 can initiate QoS and network 420 can respond with a soft rejection when network-initiated QoS is supported and/or preferred. A soft rejection, unlike a normal rejection, notifies UE 410 to wait for network-initiated QoS. A normal rejection, however, would trigger UE 410 to abort the connection and/or re-request QoS with lower requirements.

Under the soft rejection mechanism, both UE 410 and network 420 attempt to initiate QoS. The respective attempts can occur simultaneously or at different times. In one example, UE 410 can request QoS before the network 420. In general, UE 410 checks QoS is already setup for a particular packet filter utilized by an application (e.g., application 414). When a matching filter does not exist, UE 410 initiates QoS. When network 420 prefers to setup QoS, the network 420 can send a soft rejection in response to the QoS request from UE 410. UE 410, upon receipt of the soft rejection, can wait until network 420 initiates QoS. In an aspect, UE 410 can employ a timer mechanism. For instance, UE 410 can start a timer when the soft rejection is received. When the timer expires and network 420 has not initiated QoS, the application 414 can be notified that QoS failed.

According to another example, network 420 can initiate QoS before UE 410. Pursuant to this example, UE 410, when checking for matching packet filters, can discover the QoS flow setup by network 420. Accordingly, UE 410 does not attempt to initiate QoS. In another example, UE 410 and network 420 can attempt to initiate QoS simultaneously. Even though UE 410 attempts to initiate QoS, UE 410 can receive a network-initiated QoS request prior to receiving a soft rejection. Thus, UE 410 can abort the device-initiated QoS request can continue with the network-initiated request.

Figure 6:
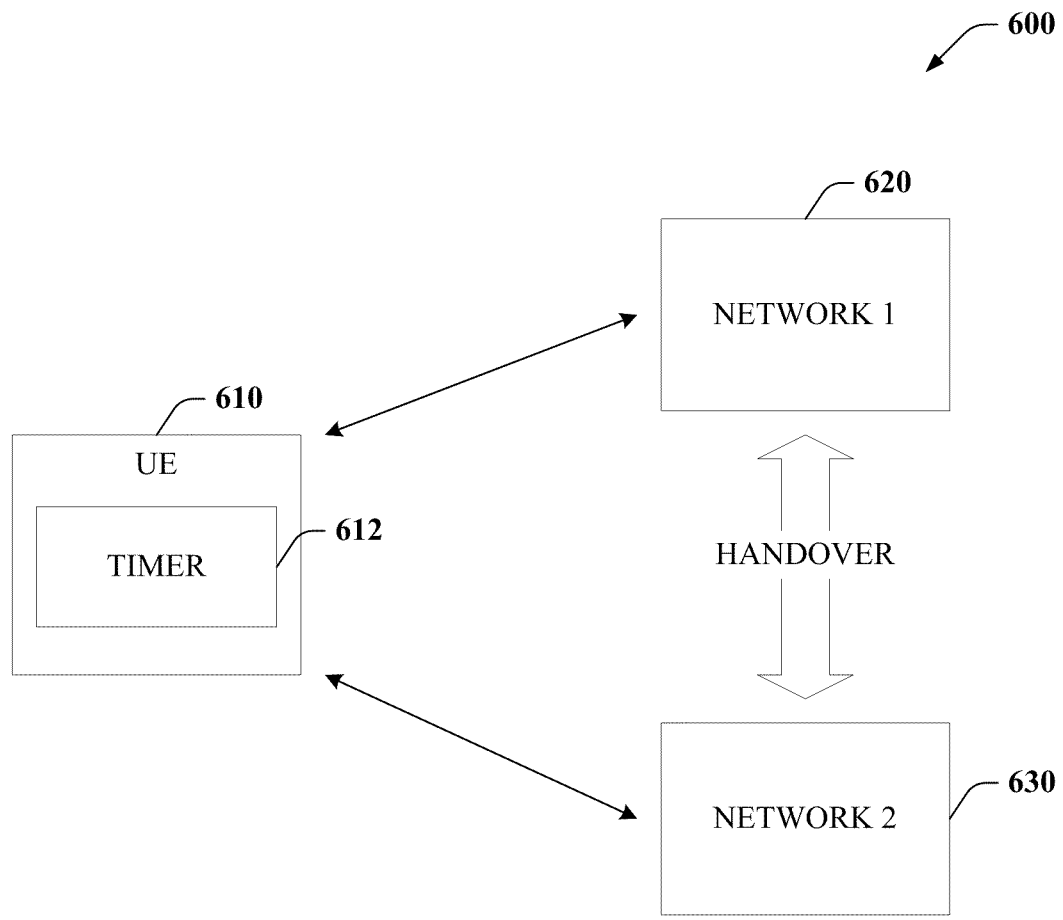
FIG. 6 is an illustration of an example system that facilitates re-establishment of QoS flows upon a handover between disparate wireless communication networks in accordance with various aspects.

Turning now to FIG. 6, illustrated is a system 600 that facilitates re-establishment of QoS flows upon a handover between disparate wireless communication networks in accordance with various aspects. System 600 includes a UE 610 attached and registered with network 620. In one example, UE 610 can have one or more service data flows active when a handover is attempted to network 630 (e.g., UE 610 roams from network 620 to network 630). Pursuant to this example, the networks 620 and 630 can utilize disparate radio access technologies. For instance, network 620 can employ E-UTRA while network 630 employs eHRPD. Upon handover, QoS associated with the one or more service data flows can be re-established.

In an aspect, when a preference indicator is employed to signal a party responsible for QoS setup, an entity that originally requested QoS can re-request QoS when moving across radio access technologies. In one example, network 620 can signal an indication that network-initiated QoS is supported and/or preferred. The original network 620 can track QoS flows associated with UE 610 and identify which are network-initiated and which are device-initiated. Upon handover from network 620 to network 630, a policy and charging rules function (PCRF) of network 620 can provide network 630 with a listing of QoS flows as well as identifications for each flow (e.g., network-initiated or device-imitated). Network 630 can setup dedicated bearers for network-initiated QoS flows from the listing. UE 610 can similarly track which QoS flows are network-initiated and which are device-initiated. Accordingly, UE 610 can re-establish Qos for flows identified as device-initiated. It is to be appreciated that if either network 620 and/or 630 does not support network-initiated QoS and/or prefers device-initiated QoS, UE 610 request QoS for all active flows upon handover.

In accordance with another aspect, UE 610 can utilize a timer mechanism 612 to facilitate re-establishment of QoS. Upon handover, network 630 can immediately setup all network-initiated QoS flows that existed between UE 610 and network 620. In one example, all network-initiated QoS flows can be established simultaneously during default bearer setup. In another example, the network-initiated QoS flows can be established sequentially. The timer 612 can start when the default bearer is established. When the timer expires, UE 610 requests QoS for all remaining flows.

Referring to FIGS. 7-10, methodologies relating to determining whether to utilize network-initiated QoS or device-initiated QoS when applications support both options are described. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 7:
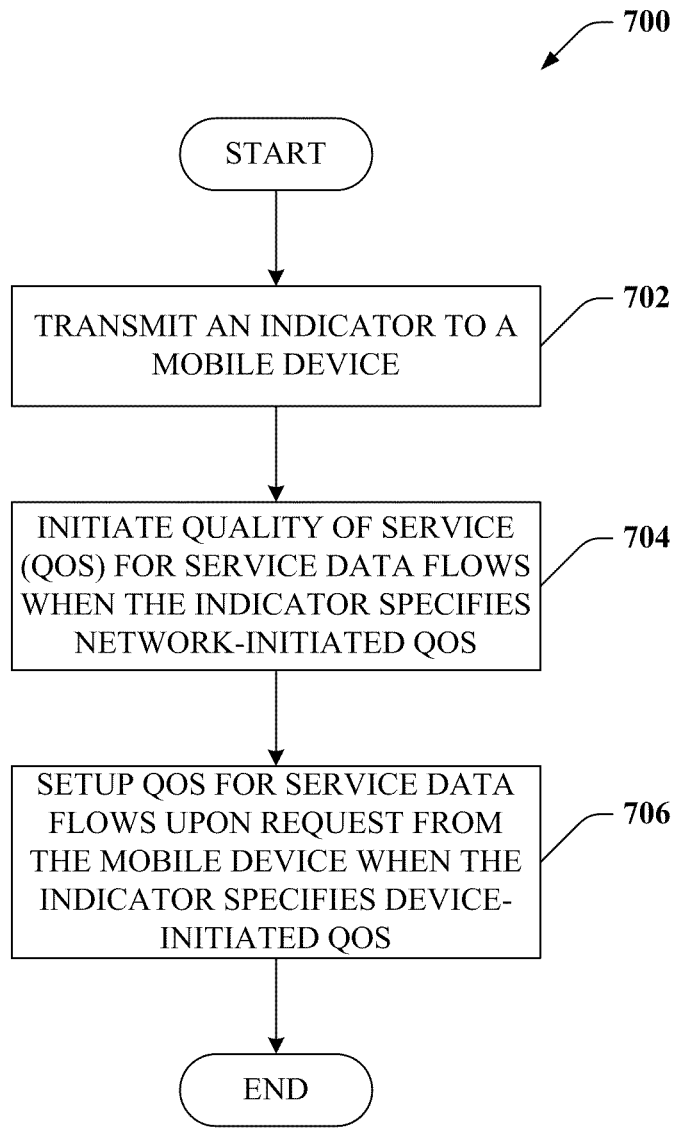
FIG. 7 is an illustration of an example methodology for signaling a network-initiated resource allocation parameter to mobile devices in accordance with various aspects.

Turning to FIG. 7, illustrated is a method 700 for signaling a network-initiated resource allocation parameter to mobile devices in accordance with various aspects. At reference numeral 702, an indicator can be transmitted to a mobile device. The indicator can specify a preference of a network for network-initiated quality of service (QoS) (e.g., a network-initiated request for QoS associated with a service data flow). In another example, the indicator can specify a preference for device-initiated QoS (e.g., a device or application initiated request for QoS associated with a service data flow). In another aspect, the indicator can notify the mobile device that the network supports or does not support network-initiated QoS.

At reference numeral 704, QoS can be initiated for service data flows when the indicator specifies a preference and/or support for network-initiated QoS. At reference numeral 706, QoS can be established for service data flows upon request from the mobile device when the indicator specifies a preference for device-initiated QoS or a lack of support of network-initiated QoS.

Figure 8:
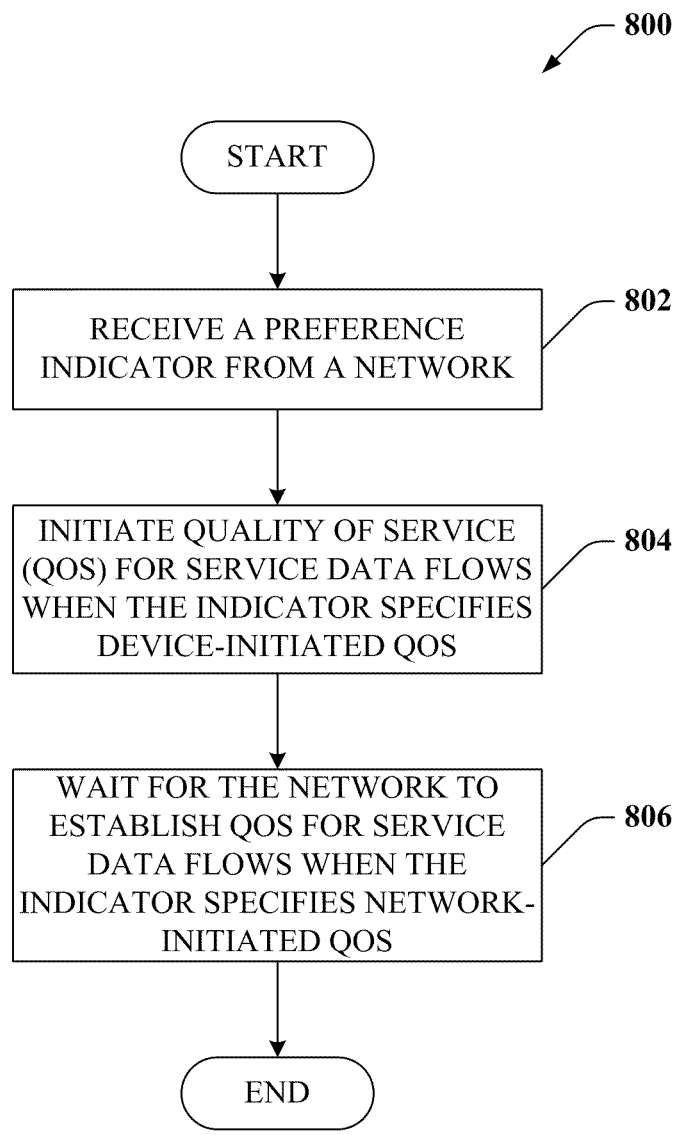
FIG. 8 is an illustration of an example methodology for establishing QoS in accordance with a parameter in accordance with various aspects.

Referring to FIG. 8, illustrated is a method 800 for establishing QoS in accordance with a parameter. At reference numeral 802, a preference indicator is received from a network. In accordance with an example, the preference indicator can be transmitted by the network when a mobile device attaches and registers with the network. For instance, the preference indicator can be included in protocol configuration options received from the network when a default bearer is established. In another example, the preference indicator can be received via control plane signaling during setup of a data connection over a radio access network.

At reference numeral 804, QoS is requested for service data flows when the indicator specifies a preference for device-initiated QoS or the indicator specifies a lack of support for network-initiated QoS. In the alternative, at reference numeral 806, a mobile device can wait for the network to establish QoS for service data flows when the indicator specifies a preference for network-initiated QoS.

Figure 9:
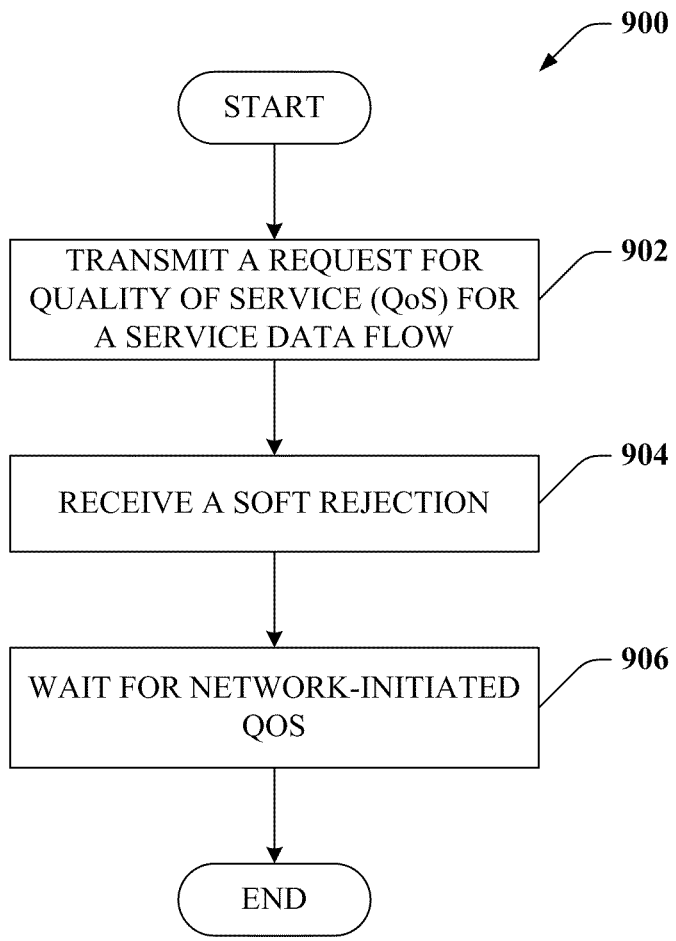
FIG. 9 is an illustration of an example methodology for employing soft rejections to determine an entity responsible for requesting quality of service (QoS) for service data flows in accordance with various aspects.
Figure 10:
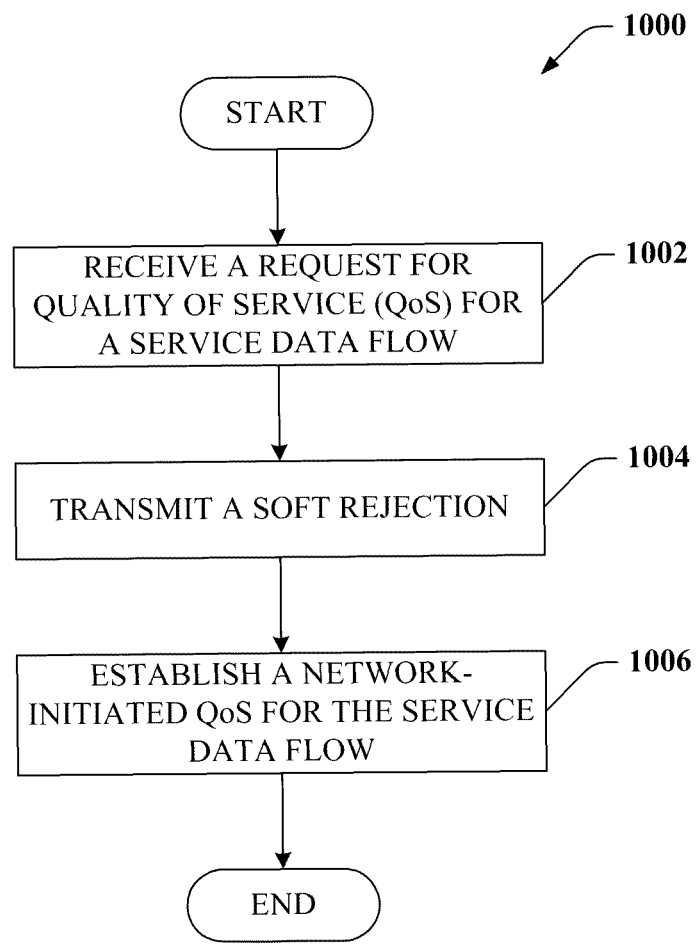
FIG. 10 is an illustration of an example methodology for utilizing soft rejections to indicate a preference for network-initiated QoS in accordance with various aspects.

FIG. 9 illustrates a method 900 for employing soft rejections to determine an entity responsible for requesting quality of service (QoS) for service data flows. At reference numeral 902, a request for QoS for a service data flow is transmitted. At reference numeral 904, a soft rejection is received from a network. At reference numeral 906, pause for network-initiated QoS. FIG. 10 illustrates a method 1000 for utilizing soft rejections to indicate a preference for network-initiated QoS. At reference numeral 1002, a request for QoS for a service data flow is received. At reference numeral 1004, a soft rejection is transmitted. At reference numeral 1006, a network-initiated QoS for the service data flow is established.

It will be appreciated that, in accordance with one or more aspects described herein, inferences can be made regarding determining a preference for network-initiated QoS or device-initiated QoS, identifying service data flows for which QoS should be requested upon handover, and the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 11:
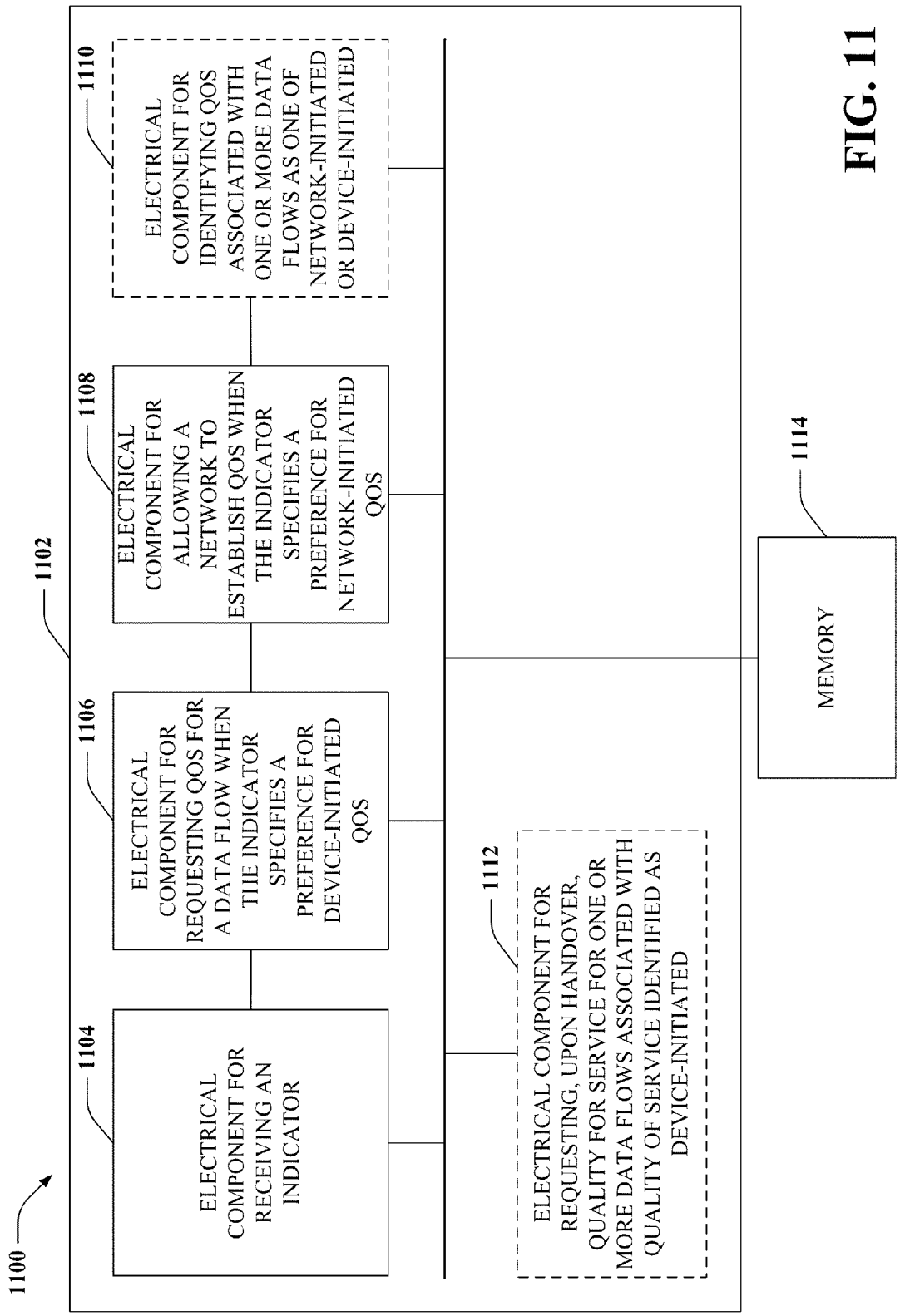
FIG. 11 is an illustration of an example system that facilitates determination of an entity responsible for establishing quality of service in accordance with various aspects.

With reference to FIG. 11, illustrated is a system 1100 that facilitates determination of an entity responsible for establishing quality of service in accordance with various aspects. For example, system 1100 can reside at least partially within a user equipment unit. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for receiving an indicator 1104. Further, logical grouping 1102 can comprise an electrical component for requesting QoS for a data blow when the indicator specifies a preference for device-initiated QoS 1106. Moreover, logical grouping 1102 can comprise an electrical component for allowing a network to establish QoS when the indicator specifies a preference for network-initiated QoS 1108. Logical grouping 1102 can also include an electrical component 1110 for identifying QoS associated with one or more data flows as one of network-initiated or device initiated. Optionally, logical grouping 1102 can include an electrical component 1112 for requesting, upon handover, QoS for one or more data flows associated with QoS identified as device-initiated. Additionally, system 1100 can include a memory 1114 that retains instructions for executing functions associated with electrical components 1104, 1106, 1108, 1110 and 1112. While shown as being external to memory 1114, it is to be understood that one or more of electrical components 1104, 1106, 1108, 1110 and 1112 can exist within memory 1114.

Figure 12:
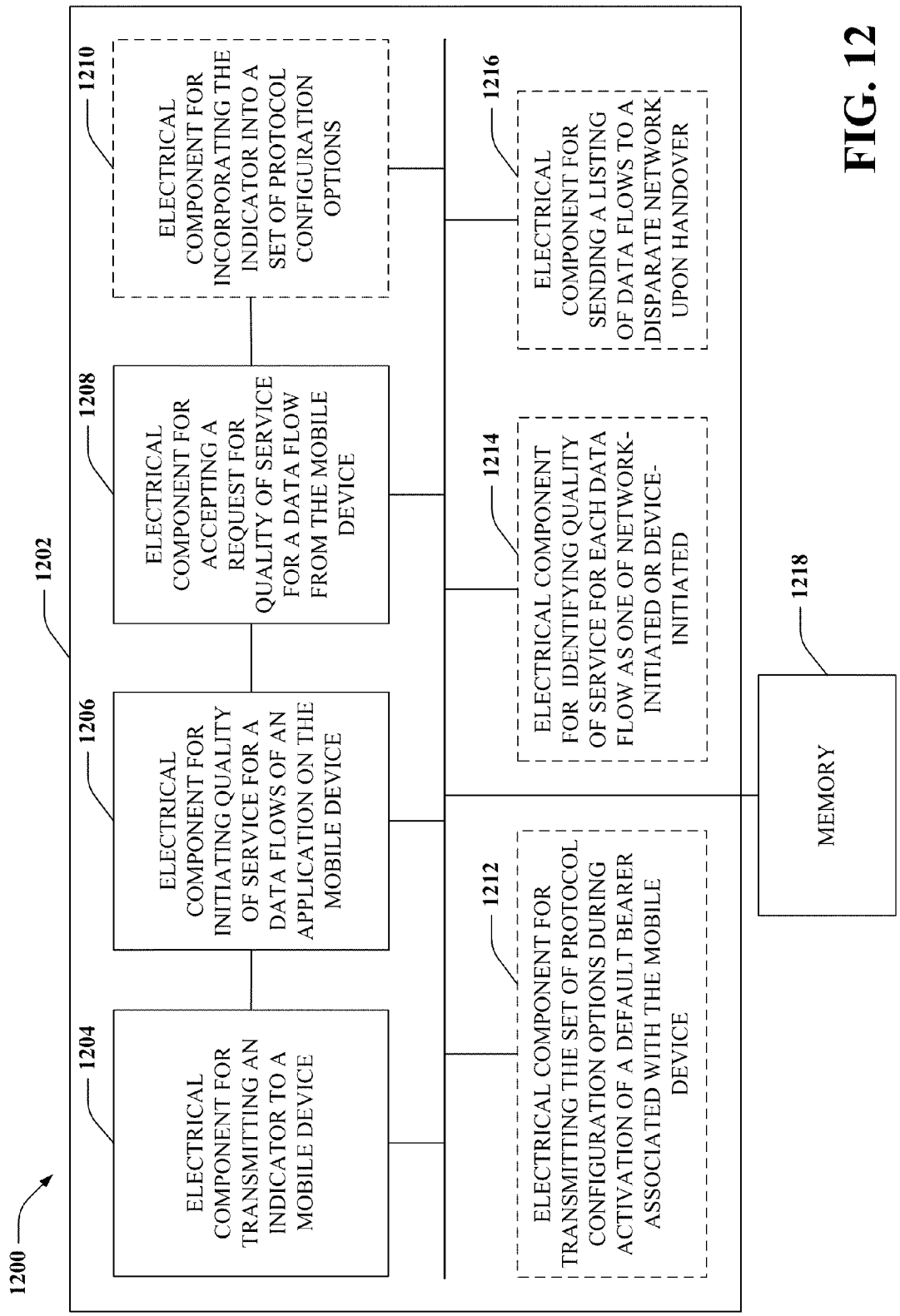
FIG. 12 is an illustration of an example system that facilitates transmission of a parameter that specifies an entity responsible for quality of service.

With reference to FIG. 12, illustrated is a system 1200 that facilitates transmission of a parameter that specifies an entity responsible for quality of service. For example, system 1200 can reside at least partially within a user equipment unit. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for transmitting an indicator to a mobile device 1204. Further, logical grouping 1202 can comprise an electrical component for initiating QoS for a data flow of an application on the mobile device 1206. Moreover, logical grouping 1202 can comprise an electrical component 1208 accepting a request for QoS from the mobile device. Logical grouping 1202 can also include an electrical component 1210 incorporating the indicator into a set of protocol configuration options. Optionally, logical grouping 1202 can include an electrical component 1212 transmitting the set of protocol configuration options during activation of a default bearer associated with a mobile device. In addition, logical grouping 1202 can include an electrical component 1214 of identifying QoS for each data flow as one of network-initiated or device-initiated. Further, logical grouping 1202 can include an electrical component 1216 for sending a listing of data flows to a disparate network upon handover. Additionally, system 1200 can include a memory 1218 that retains instructions for executing functions associated with electrical components 1204, 1206, 1208, 1210, 1212, 1214 and 1216. While shown as being external to memory 1218, it is to be understood that one or more of electrical components 1204, 1206, 1208, 1210, 1212, 1214 and 1216 can exist within memory 1218.

Figure 13:
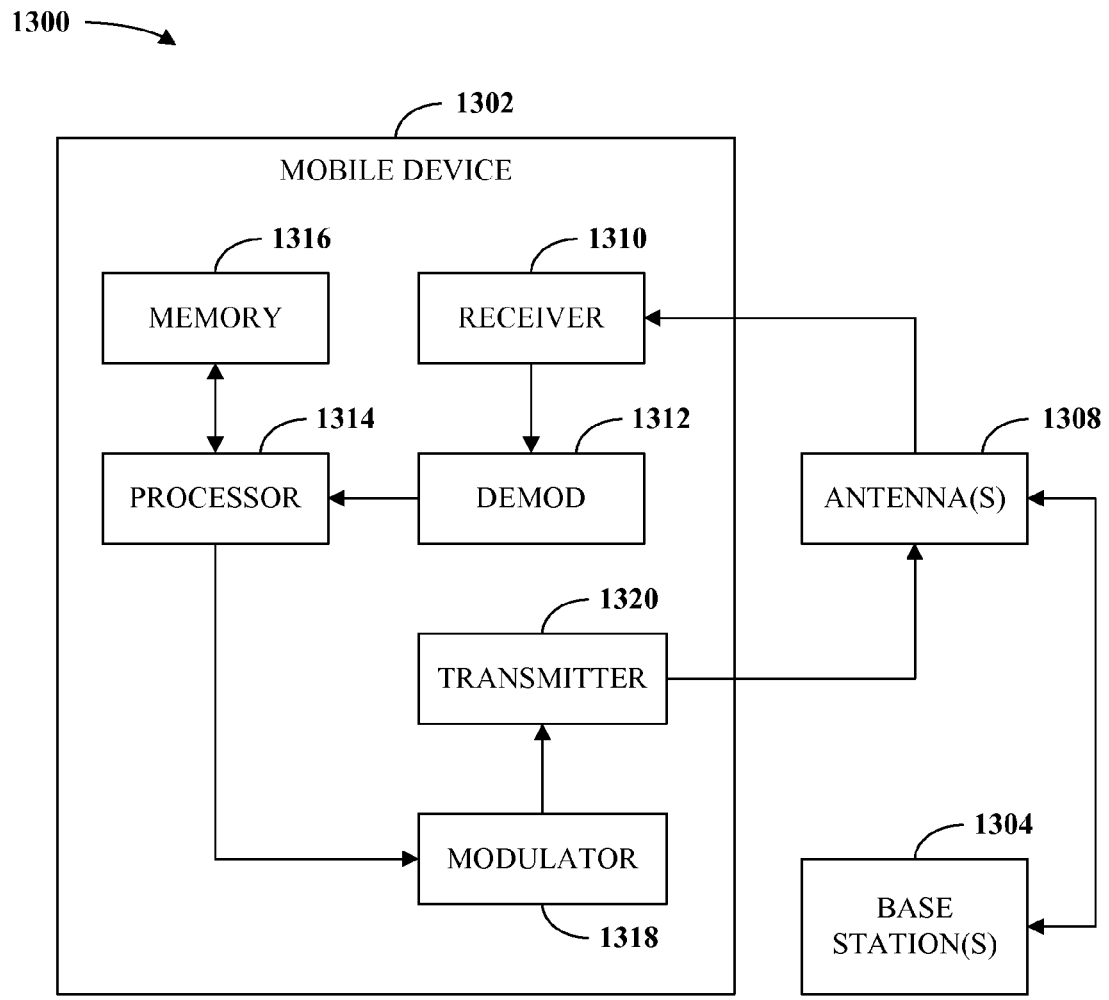
FIGS. 13-14 are block diagrams of respective wireless communication devices that can be utilized to implement various aspects of the functionality described herein.

FIG. 13 is a block diagram of another system 1300 that can be utilized to implement various aspects of the functionality described herein. In one example, system 1300 includes a mobile device 1302. As illustrated, mobile device 1302 can receive signal(s) from one or more base stations 1304 and transmit to the one or more base stations 1304 via one or more antennas 1308. Additionally, mobile device 1302 can comprise a receiver 1310 that receives information from antenna(s) 1308. In one example, receiver 1310 can be operatively associated with a demodulator (Demod) 1312 that demodulates received information. Demodulated symbols can then be analyzed by a processor 1314. Processor 1314 can be coupled to memory 1316, which can store data and/or program codes related to mobile device 1302. Mobile device 1302 can also include a modulator 1318 that can multiplex a signal for transmission by a transmitter 1320 through antenna(s) 1308.

Figure 14:
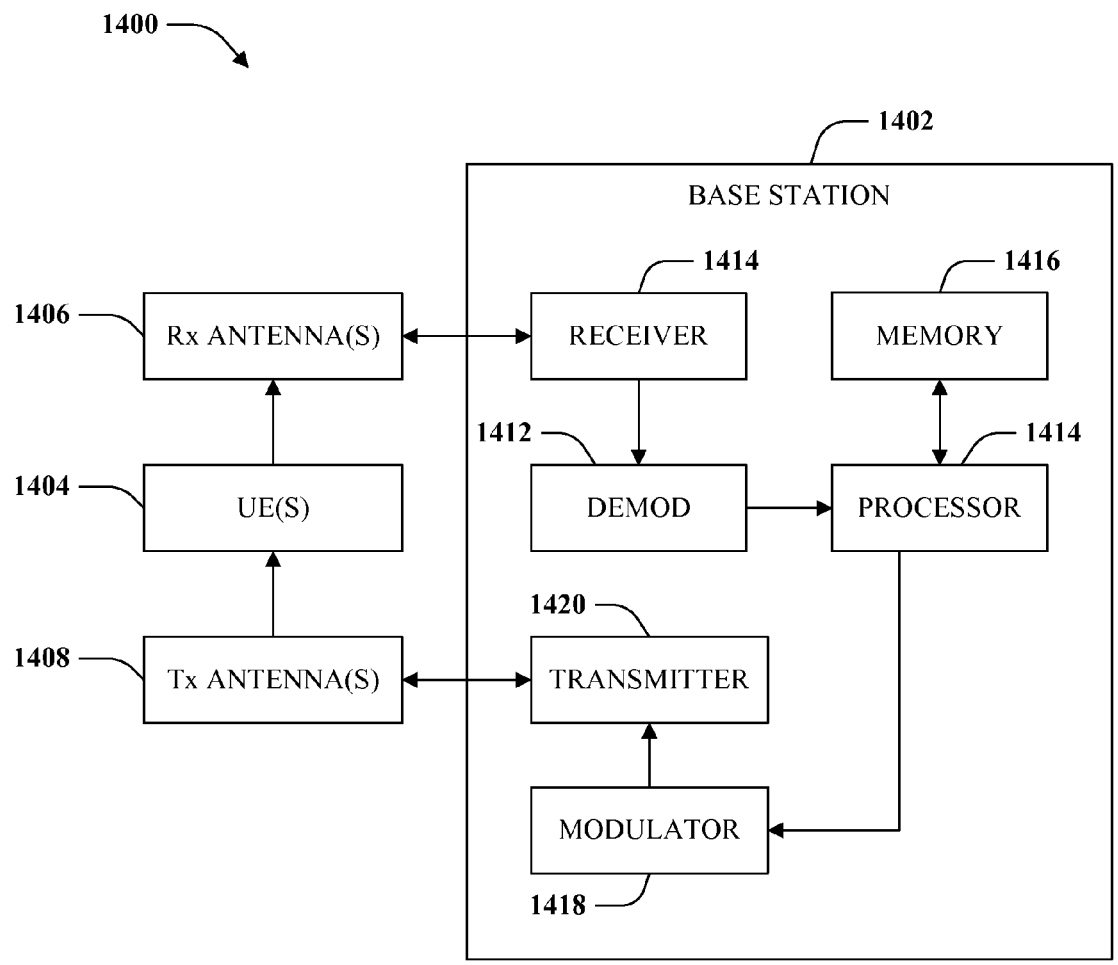

FIG. 14 is a block diagram of a system 1400 that can be utilized to implement various aspects of the functionality described herein. In one example, system 1400 includes a base station or base station 1402. As illustrated, base station 1402 can receive signal(s) from one or more UEs 1404 via one or more receive (Rx) antennas 1406 and transmit to the one or more UEs 1404 via one or more transmit (Tx) antennas 1408. Additionally, base station 1402 can comprise a receiver 1410 that receives information from receive antenna(s) 1406. In one example, the receiver 1410 can be operatively associated with a demodulator (Demod) 1412 that demodulates received information. Demodulated symbols can then be analyzed by a processor 1414. Processor 1414 can be coupled to memory 1416, which can store information related to code clusters, access terminal assignments, lookup tables related thereto, unique scrambling sequences, and/or other suitable types of information. Base station 1402 can also include a modulator 1418 that can multiplex a signal for transmission by a transmitter 1420 through transmit antenna(s) 1408.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 15:
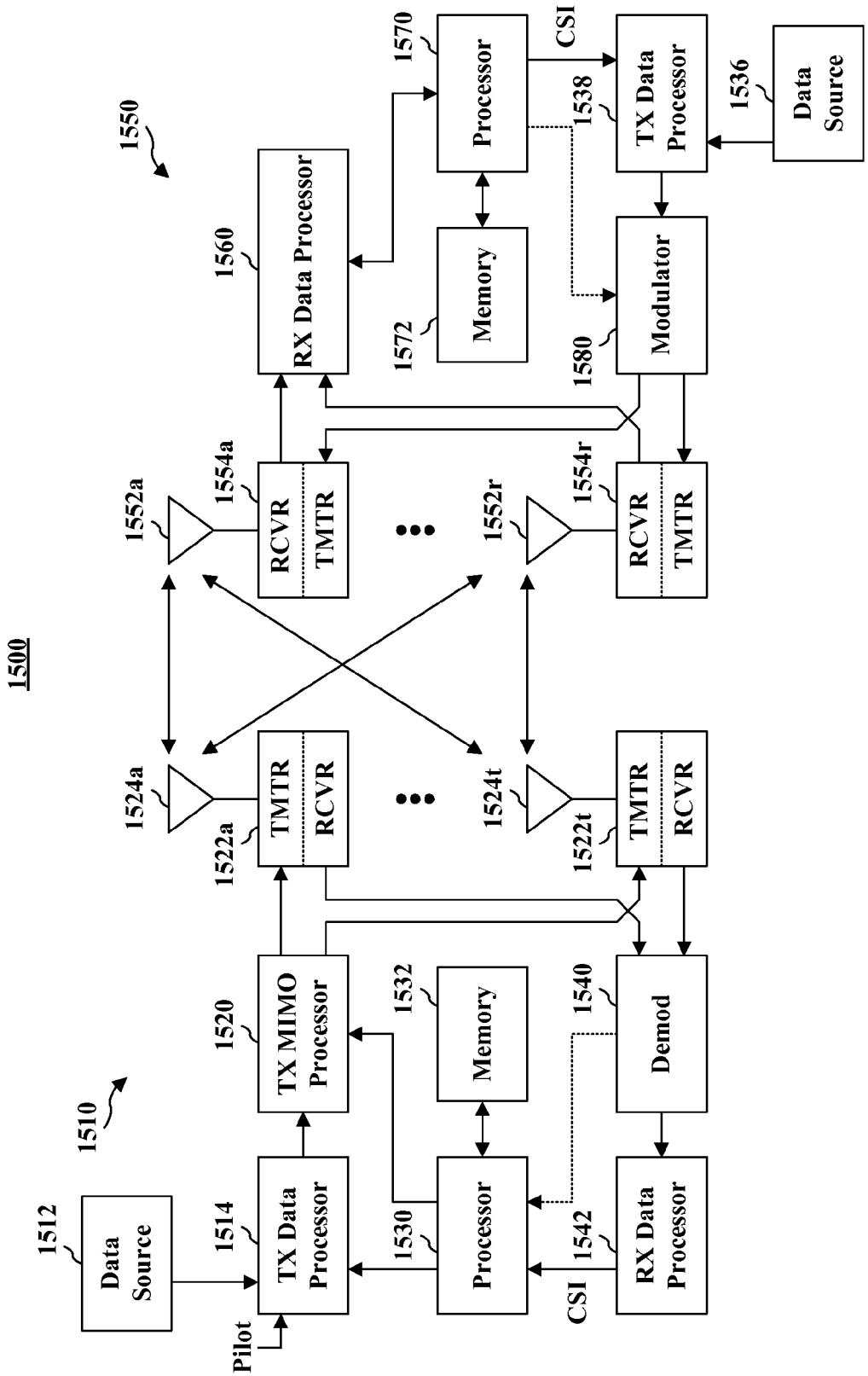
FIG. 15 is a block diagram illustrating an example wireless communication system in which various aspects described herein can function.

FIG. 15 shows an example wireless communication system 1500. The wireless communication system 1500 depicts one base station 1510 and one access terminal 1550 for sake of brevity. However, it is to be appreciated that system 1500 can include more than one base station and/or more than one access terminal, wherein additional base stations and/or access terminals can be substantially similar or different from example base station 1510 and access terminal 1550 described below. In addition, it is to be appreciated that base station 1510 and/or access terminal 1550 can employ the systems (FIGS. 1-6 and FIGS. 11-12) and/or method (FIGS. 7-10) described herein to facilitate wireless communication there between.

At base station 1510, traffic data for a number of data streams is provided from a data source 1512 to a transmit (TX) data processor 1514. According to an example, each data stream can be transmitted over a respective antenna. TX data processor 1514 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1550 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1530.

The modulation symbols for the data streams can be provided to a TX MIMO processor 1520, which can further process the modulation symbols (e.g., for OFDM). TX MIMO processor 1520 then provides $N_T$ modulation symbol streams to $N_T$ transmitters (TMTR) 1522a through 1522t. In various embodiments, TX MIMO processor 1520 applies beamforming weights to the symbols of the data streams and to the antenna from which the symbol is being transmitted.

Each transmitter 1522 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1522a through 1522t are transmitted from $N_T$ antennas 1524a through 1524t, respectively.

At access terminal 1550, the transmitted modulated signals are received by $N_R$ antennas 1552a through 1552r and the received signal from each antenna 1552 is provided to a respective receiver (RCVR) 1554a through 1554r. Each receiver 1554 conditions (e.g., filters, amplifies, and downconverts) a respective signal, digitizes the conditioned signal to provide samples, and further processes the samples to provide a corresponding "received" symbol stream.

An RX data processor 1560 can receive and process the $N_R$ received symbol streams from $N_R$ receivers 1554 based on a particular receiver processing technique to provide $N_T$ "detected" symbol streams. RX data processor 1560 can demodulate, deinterleave, and decode each detected symbol stream to recover the traffic data for the data stream. The processing by RX data processor 1560 is complementary to that performed by TX MIMO processor 1520 and TX data processor 1514 at base station 1510.

A processor 1570 can periodically determine which available technology to utilize as discussed above. Further, processor 1570 can formulate a reverse link message comprising a matrix index portion and a rank value portion.

The reverse link message can comprise various types of information regarding the communication link and/or the received data stream. The reverse link message can be processed by a TX data processor 1538, which also receives traffic data for a number of data streams from a data source 1536, modulated by a modulator 1580, conditioned by transmitters 1554a through 1554r, and transmitted back to base station 1510.

At base station 1510, the modulated signals from access terminal 1550 are received by antennas 1524, conditioned by receivers 1522, demodulated by a demodulator 1540, and processed by a RX data processor 1542 to extract the reverse link message transmitted by access terminal 1550. Further, processor 1530 can process the extracted message to determine which precoding matrix to use for determining the beamforming weights.

Processors 1530 and 1570 can direct (e.g., control, coordinate, manage, etc.) operation at base station 1510 and access terminal 1550, respectively. Respective processors 1530 and 1570 can be associated with memory 1532 and 1572 that store program codes and data. Processors 1530 and 1570 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for determining a responsible entity to establish quality of service, comprising:
   receiving an indicator that specifies a preference of a wireless network for at least one of network-initiated quality of service or device-initiated quality of service;
   requesting quality of service for a data flow when the indicator specifies a preference for device-initiated quality of service;
   waiting for the wireless network to establish quality of service when the indicator specifies a preference for network-initiated quality of service;
   tracking and identifying, by a processor, quality of service for one or more data flows as one of network-initiated or device-initiated;
   requesting the quality of service for the identified device-initiated data flows from a second network, upon handover from a first network to the second network, wherein the first network and the second network use different radio access technologies, and the first network provides the second network with a listing of identified quality of service for the one or more data flows specifying each as one of network-initiated or device-initiated;
   re-establishing device-initiated data flows based on the quality of service requested from the second network, and starting a timer while the second network setting up dedicated bearers for one or more network-initiated data flows based on the listing provided by the first network; and
   requesting quality of service for network-initiated or device-initiated data flows not established from the second network after the timer expires based on the listing provided by the first network.

2. The method of claim 1, wherein the indicator is received via protocol configuration options obtained during setup of a default bearer.

3. The method of claim 1, wherein the indicator is obtained via radio resource control plane signaling.

4. The method of claim 1, wherein the indicator is received via user plane signaling during establishment of a communication session for an application.

5. The method of claim 1, further comprising:
   requesting quality of service for a data flow; and
   receiving a soft rejection in response, wherein the soft rejection is configured to instruct the mobile device to wait for network-initiated quality of service.

6. The method of claim 1, further comprising:
   waiting for the wireless network to establish quality of service for a set of data flows upon receiving a soft rejection from the wireless communication network;
   identifying data flows from the set of data flows for which quality of service is established, wherein identifying comprises evaluating packet filters associated with established quality of service to identify a corresponding data flow; and
   initiating quality of service for data flows from the set of data flows for which quality of service is not established by the wireless network.

7. An apparatus, comprising:
   a memory that retains instructions for:
      receiving an indicator that specifies a preference of a wireless network for at least one of network-initiated quality of service or device-initiated quality of service,
      requesting quality of service for a data flow when the indicator specifies a preference for device-initiated quality of service,
      allowing the wireless network to establish quality of service when the indicator specifies a preference for network-initiated quality of service,
      tracking and identifying quality of service for one or more data flows as one of network-initiated or device-initiated,
      requesting the quality for service for the identified device-initiated data flows from a second network, upon handover from a first network to the second network, wherein the first network and the second network use different radio access technologies, and the first network provides the second network with a listing of identified quality of service for the one or more data flows specifying each as one of network-initiated or device-initiated,
      re-establishing device-initiated data flows based on the quality of service requested from the second network, and starting a timer while the second network setting up dedicated bearers for one or more network-initiated data flows based on the listing provided by the first network, and
      requesting quality of service for network-initiated or device-initiated data flows not established from the second network after the timer expires based on the listing provided by the first network; and
   a processor, coupled to the memory, configured to execute the instructions retained in the memory.

8. The apparatus of claim 7, wherein the indicator is received via protocol configuration options obtained during setup of a default bearer.

9. The apparatus of claim 7, wherein the indicator is obtained via radio resource control plane signaling.

10. The apparatus of claim 7, wherein the indicator is received via user-plane signaling during establishment of a communication session for an application.

11. A wireless communication apparatus, comprising:
   means for receiving an indicator that specifies a preference of a wireless network for at least one of network-initiated quality of service or device-initiated quality of service;
   means for requesting quality of service for a data flow when the indicator specifies a preference for device-initiated quality of service;
   means for allowing the wireless network to establish quality of service when the indicator specifies a preference for network-initiated quality of service;
   means for tracking and identifying quality of service for one or more data flows as one of network-initiated or device-initiated;
   means for requesting the quality for service for the identified device-initiated data flows from a second network, upon handover from a first network to the second network, wherein the first network and the second network use different radio access technologies, and the first network provides the second network with a listing of identified quality of service for the one or more data flows specifying each as one of network-initiated or device-initiated;
   means for re-establishing device-initiated data flows based on the quality of service requested from the second network, and starting a timer while the second network setting up dedicated bearers for one or more network-initiated data flows based on the listing provided by the first network; and means for requesting quality of service for network-initiated or device-initiated data flows not established from the second network after the timer expires based on the listing provided by the first network.

12. The wireless communication apparatus of claim 11, wherein the indicator is received via protocol configuration options obtained during setup of a default bearer.

13. The wireless communication apparatus of claim 11, wherein the indicator is obtained via radio resource control plane signaling.

14. The wireless communication apparatus of claim 11, wherein the indicator is received via user-plane signaling during establishment of a communication session for an application.

15. A non-transitory computer-readable medium having control logic stored therein for causing at least one computer to determine a responsible entity to establish quality of service, the non-transitory computer-readable medium comprising:
code for causing the at least one computer to obtain an indicator from a network, wherein the indicator specifies a preference by the network for at least one of device-initiated quality of service or network-initiated quality of service;
code for causing the at least one computer to establish quality of service for a data flow in accordance with the indicator;
code for causing the at least one computer to track and identify quality of service for one or more data flows as one of network-initiated or device-initiated;
code for causing the at least one computer to request the quality for service for the identified device-initiated data flows from a second network, upon handover from a first network to the second network, wherein the first network and the second network use different radio access technologies, and the first network provides the second network with a listing of identified quality of service for the one or more data flows specifying each as one of network-initiated or device-initiated;
code for causing the at least one computer to re-establish device-initiated data flows based on the quality of service requested from the second network, and start a timer while the second network setting up dedicated bearers for one or more network-initiated data flows based on the listing provided by the first network; and
code for causing the at least one computer to request quality of service for network-initiated or device-initiated data flows not established from the second network after the timer expires based on the listing provided by the first network.

16. The non-transitory computer-readable medium of claim 15, further comprising code for causing the at least one computer to request quality of service for a data flow when the indicator specifies a preference for device-initiated quality of service.

17. The non-transitory computer-readable medium of claim 15, further comprising code for accepting a network-initiated quality of service for a data flow when the indicator specifies a preference for network-initiated quality of service.

18. The non-transitory computer-readable medium of claim 15, further comprising code for causing the at least one computer to request quality of service for all flows in the set of flows when the indicator specifies a preference for device-initiated quality of service.

19. A wireless communication apparatus, comprising:
a processor configured to:
obtain an indicator from a network, wherein the indicator specifies a preference by the network for at least one of device-initiated quality of service or network-initiated quality of service;
request quality of service for a data flow when the indicator specifies a preference for device-initiated quality of service;
accept a network-initiated quality of service for the data flow when the indicator specifies a preference for network-initiated quality of service;
track and identify quality of service for one or more data flows as one of network-initiated or device-initiated;
request the quality for service for the identified device-initiated data flows from a second network, upon handover from a first network to the second network, wherein the first network and the second network use different radio access technologies, and the first network provides the second network with a listing of identified quality of service for the one or more data flows specifying each as one of network-initiated or device-initiated;
re-establish device-initiated data flows based on the quality of service requested from the second network, and start a timer while the second network setting up dedicated bearers for one or more network-initiated data flows based on the listing provided by the first network; and
request quality of service for network-initiated or device-initiated data flows not established from the second network after the timer expires based on the listing provided by the first network.

20. A method for utilizing a parameter to specify an entity responsible to establish quality of service, comprising:
transmitting an indicator to a mobile device, wherein the indicator specifies a preference for at least one of a network-initiated quality of service or device-initiated quality of service;
initiating, by a processor, quality of service for a data flow of an application on the mobile device when the indicator specifies a preference for network-initiated quality of service;
accepting a request for quality of service for the data flow from the mobile device when the indicator specifies a preference for device-initiated quality of service; and
providing from a first network to a second network, upon detecting a handover of the mobile device from the first network to the second network, a listing of data flows specifying each data flow as one of network-initiated or device-initiated, wherein the first network and the second network use different radio access technologies,
wherein the mobile device is configured to:
re-establish device-initiated data flows based on the quality of service requested from the second network, and start a timer while the second network setting up dedicated bearers for one or more network-initiated data flows based on the listing provided by the first network, and
request quality of service for network-initiated or device-initiated data flows not established from the second network after the timer expires based on the listing provided by the first network.

21. The method of claim 20, wherein transmitting the indicator comprises:
incorporating the indicator into a set of protocol configuration options; and transmitting the set of protocol configuration options during activation of a default bearer associated with the mobile device.

22. The method of claim 20, further comprising tracking quality of service per data flow and identifying quality of service for each data flow as one of network-initiated or device-initiated.

23. An apparatus, comprising:
a memory that retains instructions for:
transmitting an indicator to a mobile device, wherein the indicator specifies a preference for at least one of a network-initiated quality of service or device-initiated quality of service,
initiating quality of service for a data flow of an application on the mobile device when the indicator specifies a preference for network-initiated quality of service,
accepting a request for quality of service for a data flow from the mobile device when the indicator specifies a preference for device-initiated quality of service, and
providing from a first network to a second network, upon detecting a handover of the mobile device from the first network to the second network, a listing of data flows specifying each data flow as one of network-initiated or device-initiated, wherein the first network and the second network use different radio access technologies,
wherein the mobile device is configured to:
re-establish device-initiated data flows based on the quality of service requested from the second network, and start a timer while the second network setting up dedicated bearers for one or more network-initiated data flows based on the listing provided by the first network, and
request quality of service for network-initiated or device-initiated data flows not established from the second network after the timer expires based on the listing provided by the first network; and
a processor coupled to the memory, wherein the processor is configured to execute the instructions retained in the memory.

24. The apparatus of claim 23, wherein the memory further retains instructions for incorporating the indicator into a set of protocol configuration options and transmitting the set of protocol configuration options during activation of a default bearer associated with the mobile device.

25. The apparatus of claim 23, wherein the memory further retains instructions for tracking quality of service per data flow and identifying quality of service for each data flow as one of network-initiated or device-initiated.

26. A wireless communication apparatus, comprising:
means for transmitting an indicator to a mobile device, wherein the indicator specifies a preference for at least one of a network-initiated quality of service or device-initiated quality of service;
means for initiating quality of service for a data flow of an application on the mobile device when the indicator specifies a preference for network-initiated quality of service;
means for accepting a request for quality of service for a data flow from the mobile device when the indicator specifies a preference for device-initiated quality of service; and
means for sending from a first network to a second network, upon detecting a handover of the mobile device from the first network to the second network, a listing of data flows specifying each data flow as one of network-initiated or device-initiated, wherein the first network and the second network use different radio access technologies,
wherein the mobile device is configured to:
re-establish device-initiated data flows based on the quality of service requested from the second network, and start a timer while the second network setting up dedicated bearers for one or more network-initiated data flows based on the listing provided by the first network, and
request quality of service for network-initiated or device-initiated data flows not established from the second network after the timer expires based on the listing provided by the first network.

27. The wireless communication apparatus of claim 26, further comprising:
means for incorporating the indicator into a set of protocol configuration options; and
means for transmitting the set of protocol configuration options during activation of a default bearer associated with the mobile device.

28. The wireless communication apparatus of claim 26, further comprising means for identifying quality of service for each data flow as one of network-initiated or device-initiated.

29. A non-transitory computer-readable medium having control logic stored therein for causing at least one computer to determine a responsible entity to establish quality of service, the non-transitory computer-readable medium comprising:
code for causing the at least one computer to transmit an indicator to a mobile device, wherein the indicator specifies a preference by a network for at least one of device-initiated quality of service or network-initiated quality of service;
code for causing the at least one computer to establish quality of service for a data flow associated with the mobile device in accordance with the indicator; and
code for causing the at least one computer to forward from a first network to a second network, upon detecting a handover of the mobile device from the first network to the second network, a listing of data flows specifying each data flow as one of network-initiated or device-initiated, wherein the first network and the second network use different radio access technologies,
wherein the mobile device is configured to:
re-establish device-initiated data flows based on the quality of service requested from the second network, and start a timer while the second network setting up dedicated bearers for one or more network-initiated data flows based on the listing provided by the first network, and
request quality of service for network-initiated or device-initiated data flows not established from the second network after the timer expires based on the listing provided by the first network.

30. The non-transitory computer-readable medium of claim 29, further comprising:
code for causing the at least one computer to incorporate the indicator into a set of protocol configuration options; and
code for causing the at least one computer to transmit the set of protocol configuration options during activation of a default bearer associated with the mobile device.

31. The non-transitory computer-readable medium of claim 29, further comprising code for causing the at least one computer to identify quality of service for each data flow as one of network-initiated or device-initiated.

32. The non-transitory computer-readable medium of claim 29, further comprising code for causing the at least one computer to initiate quality of service for a data flow of an application on the mobile device when the indicator specifies a preference for network-initiated quality of service.

33. The non-transitory computer-readable medium of claim 29, further comprising code for causing the at least one computer to accept a request for quality of service for a data flow from the mobile device when the indicator specifies a preference for device-initiated quality of service.

34. A wireless communication apparatus, comprising:
a processor configured to:
transmit an indicator to a mobile device, wherein the indicator specifies a preference by a network for at least one of device-initiated quality of service or network-initiated quality of service;
accept a request for quality of service for a data flow from the mobile device when the indicator specifies a preference for device-initiated quality of service;
establish quality of service for a data flow of an application on the mobile device when the indicator specifies a preference for network-initiated quality of service; and
forward from a first network to a second network, upon detecting a handover of the mobile device from the first network to the second network, a listing of data flows specifying each data flow as one of network-initiated or device-initiated, wherein the first network and the second network use different radio access technologies,
wherein the mobile device is configured to:
re-establish device-initiated data flows based on the quality of service requested from the second network, and start a timer while the second network setting up dedicated bearers for one or more network-initiated data flows based on the listing provided by the first network, and
request quality of service for network-initiated or device-initiated data flows not established from the second network after the timer expires based on the listing provided by the first network.

35. The wireless communication apparatus of claim 34, the processor is further configured to:
incorporate the indicator into a set of protocol configuration options; and
transmit the set of protocol configuration options during activation of a default bearer associated with the mobile device.

36. A method, comprising:
releasing established quality of service identified as device-initiated in response to a request from a mobile device based at least in part upon the mobile device comparing first packet filters associated with established quality of service identified as network-initiated and second packet filters associated with the established quality of service identified as device-initiated, and detecting a match between the first and second packet filters;
receiving a request to initiate quality of service for a data flow from the mobile device;
issuing, by a processor, a soft rejection to the mobile device in response to the request, wherein the soft rejection is configured to instruct the mobile device to wait for network-initiated quality of service; and
establishing the network-initiated quality of service for the data flow via a network request in response to the soft rejection.

37. A method, comprising:
waiting for the wireless communication network to establish quality of service for a set of data flows, upon receiving a soft rejection from a wireless communication network, wherein the waiting comprises starting a timer configured to a pre-determined period;
identifying, by a processor, data flows from the set of data flows for which quality of service is established, wherein the identifying comprises comparing first packet filters associated with established quality of service identified as network-initiated and second packet filters associated with established quality of service identified as device-initiated, and upon detecting a match between the first and second packet filters, requesting to release the established quality of service identified as device-initiated; and
initiating quality of service for data flows from the set of data flows for which quality of service is not established by the wireless communication network after the timer expires.

38. An apparatus, comprising:
a memory that retains instructions for:
releasing established quality of service identified as device-initiated in response to a request from a mobile device based at least in part upon the mobile device comparing first packet filters associated with established quality of service identified as network-initiated and second packet filters associated with the established quality of service identified as device-initiated, and detecting a match between the first and second packet filters;
receiving a request to initiate quality of service for a data flow from the mobile device,
issuing a soft rejection to the mobile device in response to the request, wherein the soft rejection is configured to instruct the mobile device to wait for network-initiated quality of service, and
establishing the network-initiated quality of service for the data flow via a network request in response to the soft rejection; and
a processor, coupled to the memory, configured to execute the instructions retained in the memory.

39. A wireless communication apparatus, comprising:
means for releasing established quality of service identified as device-initiated in response to a request from a mobile device based at least in part upon the mobile device comparing first packet filters associated with established quality of service identified as network-initiated and second packet filters associated with the established quality of service identified as device-initiated, and detecting a match between the first and second packet filters;
means for receiving a request to initiate quality of service for a data flow from the mobile device;
means for issuing a soft rejection to the mobile device in response to the request, wherein the soft rejection is configured to instruct the mobile device to wait for network-initiated quality of service; and
means for establishing the network-initiated quality of service for the data flow via a network request in response to the soft rejection.

40. A non-transitory computer-readable medium having control logic stored therein for causing at least one computer to determine a responsible entity to establish quality of service, the non-transitory computer-readable medium comprising:

code for causing the at least one computer to release established quality of service identified as device-initiated in response to a request from a mobile device based at least in part upon the mobile device comparing first packet filters associated with established quality of service identified as network-initiated and second packet filters associated with the established quality of service identified as device-initiated, and detecting a match between the first and second packet filters;

code for causing the at least one computer to receive a request to initiate quality of service for a data flow from the mobile device;

code for causing the at least one computer to issue a soft rejection to the mobile device in response to the request, wherein the soft rejection is configured to instruct the mobile device to wait for network-initiated quality of service; and code for causing the at least one computer to establish the network-initiated quality of service for the data flow via a network request in response to the soft rejection.

41. A wireless communication apparatus, comprising:
a processor configured to:
release established quality of service identified as device-initiated in response to a request from a mobile device based at least in part upon the mobile device comparing first packet filters associated with established quality of service identified as network-initiated and second packet filters associated with the established quality of service identified as device-initiated, and detecting a match between the first and second packet filters;
receive a request to initiate quality of service for a data flow from the mobile device;
issue a soft rejection to the mobile device in response to the request, wherein the soft rejection is configured to instruct the mobile device to wait for network-initiated quality of service, and the mobile device is configured to compare first packet filters associated with established quality of service identified as network-initiated and second packet filters associated with established quality of service identified as device-initiated, and upon detecting a match between the first and second packet filters, release the established quality of service identified as device-initiated; and
establish the network-initiated quality of service for the data flow via a network request in response to the soft rejection.

42. An apparatus, comprising:
a memory that retains instructions for:
waiting for the wireless communication network to establish quality of service for a set of data flows, upon receiving a soft rejection from a wireless communication network, wherein the waiting comprises starting a timer configured to a pre-determined period,
identifying data flows from the set of data flows for which quality of service is established, wherein the identifying comprises comparing first packet filters associated with established quality of service identified as network-initiated and second packet filters associated with established quality of service identified as device-initiated, and upon detecting a match between the first and second packet filters, releasing the established quality of service identified as device-initiated, and
initiating quality of service for data flows from the set of data flows for which quality of service is not established by the wireless communication network after the timer expires; and
a processor, coupled to the memory, configured to execute the instructions retained in the memory.

43. A wireless communication apparatus, comprising:
means for waiting for the wireless communication network to establish quality of service for a set of data flows, upon receiving a soft rejection from a wireless communication network, wherein the waiting comprises starting a timer configured to a pre-determined period;
means for identifying data flows from the set of data flows for which quality of service is established, wherein the identifying comprises comparing first packet filters associated with established quality of service identified as network-initiated and second packet filters associated with established quality of service identified as device-initiated, and upon detecting a match between the first and second packet filters, releasing the established quality of service identified as device-initiated; and
means for initiating quality of service for data flows from the set of data flows for which quality of service is not established by the wireless communication network after the timer expires.

44. A non-transitory computer-readable medium having control logic stored therein for causing at least one computer to determine a responsible entity to establish quality of service, the non-transitory computer-readable medium comprising:
code for causing the at least one computer to wait for the wireless communication network to establish quality of service for a set of data flows, upon receiving a soft rejection from a wireless communication network, wherein the waiting comprises starting a timer configured to a pre-determined period;
code for causing the at least one computer to identify data flows from the set of data flows for which quality of service is established, wherein the identifying comprises comparing first packet filters associated with established quality of service identified as network-initiated and second packet filters associated with established quality of service identified as device-initiated, and upon detecting a match between the first and second packet filters, releasing the established quality of service identified as device-initiated; and
code for causing the at least one computer to initiate quality of service for data flows from the set of data flows for which quality of service is not established by the wireless communication network after the timer expires.

45. A wireless communication apparatus, comprising:
a processor configured to:
upon receiving a soft rejection from a wireless communication network, wait for the wireless communication network to establish quality of service for a set of data flows, wherein the waiting comprises starting a timer configured to a pre-determined period;
identify data flows from the set of data flows for which quality of service is established, wherein the identifying comprises comparing first packet filters associated with established quality of service identified as network-initiated and second packet filters associated with established quality of service identified as device-initiated, and upon detecting a match between the first and second packet filters, releasing the established quality of service identified as device-initiated; and initiate quality of service for data flows from the set of data flows for which quality of service is not established by the wireless communication network after the timer expires.

\* \* \* \* \*